United States Patent
Takeo et al.

(10) Patent No.: US 8,768,817 B2
(45) Date of Patent: Jul. 1, 2014

(54) TRANSACTION SYSTEM

(75) Inventors: Shuuzou Takeo, Yokohama (JP); Shintaro Yamabe, Ikeda (JP); Tadashi Kanazawa, Toyonaka (JP); Hideyuki Kato, Machida (JP); Yasuo Aihara, Suita (JP); Kiyoshi Yamada, Kawasaki (JP); Shigeru Tachikawa, Kawasaki (JP); Kazuhiko Ota, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 892 days.

(21) Appl. No.: 11/656,993

(22) Filed: Jan. 24, 2007

(65) Prior Publication Data

US 2007/0192208 A1 Aug. 16, 2007

(30) Foreign Application Priority Data

Jan. 26, 2006 (JP) ................................. 2006-017048
Feb. 22, 2006 (JP) ................................. 2006-044648
Feb. 24, 2006 (JP) ................................. 2006-047667

(51) Int. Cl.
*G06Q 30/00* (2012.01)
*G06Q 40/00* (2012.01)

(52) U.S. Cl.
CPC ............... *G06Q 40/00* (2013.01); *G06Q 30/00* (2013.01)
USPC ........... 705/37; 705/26.4; 705/26.41; 705/35; 705/36 R

(58) Field of Classification Search
USPC .................... 705/26.4, 26.41, 35, 36 R, 37
See application file for complete search history.

(56) References Cited

U.S. PATENT DOCUMENTS

| | | | |
|---|---|---|---|
| 6,418,419 B1 * | 7/2002 | Nieboer et al. ................. | 705/37 |
| 7,024,387 B1 * | 4/2006 | Nieboer et al. ................. | 705/37 |
| 7,398,237 B2 * | 7/2008 | Agostini et al. ................ | 705/35 |
| 2002/0013753 A1 * | 1/2002 | Marks de Chabris et al. .. | 705/36 |
| 2002/0046137 A1 * | 4/2002 | Odom et al. .................... | 705/26 |
| 2002/0052821 A1 * | 5/2002 | Terashima ...................... | 705/37 |
| 2002/0052827 A1 * | 5/2002 | Waelbroeck et al. ........... | 705/37 |
| 2002/0128945 A1 * | 9/2002 | Moss et al. ..................... | 705/37 |
| 2002/0194099 A1 * | 12/2002 | Weiss ............................. | 705/36 |
| 2003/0004859 A1 * | 1/2003 | Shaw et al. ..................... | 705/37 |
| 2003/0050879 A1 * | 3/2003 | Rosen et al. .................... | 705/35 |
| 2003/0093343 A1 * | 5/2003 | Huttenlocher et al. ......... | 705/35 |
| 2003/0101128 A1 * | 5/2003 | Abernethy ...................... | 705/37 |
| 2003/0225675 A1 * | 12/2003 | Failla et al. .................... | 705/37 |
| 2004/0002913 A1 * | 1/2004 | Breen et al. .................... | 705/37 |

(Continued)

FOREIGN PATENT DOCUMENTS

| | | |
|---|---|---|
| JP | 8-106501 | 4/1996 |
| JP | 2001-297195 | 10/2001 |

*Primary Examiner* — Gregory Johnson
(74) *Attorney, Agent, or Firm* — Brundidge & Stanger, P.C.

(57) ABSTRACT

With respect to one order information piece in security transaction, processing of reception, transaction condition confirmation, transaction settlement and result transmission is executed serially. A transaction system is configured so as to divide a transaction including a plurality of transaction requests into predetermined units and execute resultant processing units in parallel. When such division is conducted, the sequential property is ensured. For example, the progress situation of processing is stored in a database every processing and every step. Issues, terminals, markets and servers are included as predetermined units.

22 Claims, 16 Drawing Sheets

(56) References Cited

U.S. PATENT DOCUMENTS

| | | | |
|---|---|---|---|
| 2004/0034591 A1* | 2/2004 | Waelbroeck et al. | 705/37 |
| 2004/0215538 A1* | 10/2004 | Smith et al. | 705/35 |
| 2004/0236668 A1* | 11/2004 | Toffey | 705/37 |
| 2005/0015323 A1* | 1/2005 | Myr | 705/37 |
| 2005/0076059 A1 | 4/2005 | Nomura et al. | |
| 2005/0187857 A1* | 8/2005 | Tull, Jr. | 705/37 |
| 2005/0222936 A1* | 10/2005 | Panariti et al. | 705/37 |
| 2006/0149659 A1* | 7/2006 | Carone et al. | 705/37 |
| 2007/0011079 A1* | 1/2007 | May | 705/37 |
| 2007/0294159 A1* | 12/2007 | Cottle | 705/37 |

\* cited by examiner

*TERMINAL GROUP: TERMINAL SERVER AND DIRECT COUPLED SYSTEM ARE GROUPED
ISSUE GROUP: A PLURALITY OF ISSUES ARE GROUPED

TRANSACTION SYSTEM

INCORPORATION BY REFERENCE

The present application claims priorities from Japanese applications JP2006-044648 filed on Feb. 22, 2006; JP2006-017048 filed on Jan. 26, 2006, JP2006-047667 filed on Feb. 24, 2006, the contents of which are hereby incorporated by reference into this application.

BACKGROUND OF THE INVENTION

The present invention relates to a technique for implementing business including transactions of commodities inclusive of securities such as stocks. Among them, the present invention relates to transactions, especially a security transaction system used in exchanges called security markets, its method, and a program therefore.

Conventionally, in transactions including security transactions, a transaction is settled by receiving order information pieces, comparing order information pieces with each other and determining whether a transaction condition is satisfied (JP-A-2001-297195, hereafter referred to as conventional technique 1). More specifically, order information and transaction information concerning security buying and selling input from an input device 32 are stored in a transaction storage 34 and a contract storage 36 via a control device 33. Order information and transaction information are transmitted to customers 10 and 20 via an order information transmitter 35, and displayed on a display device 12. If a transaction is settled, then transaction settlement information is transmitted via a transaction settlement information transmitter 37 and displayed on the display device 12 and a warning sound is emitted from a speaker 13. If transaction contents are confirmed, then the order information and the transaction settlement information are deleted and customer identification information, the order information and the transaction information are stored in the contract storage 36.

Conventionally, when executing business such as security transactions, it is executed to cause a plurality of processors to cooperate and implement business. Such processing is executed by using the so-called queue. For example, a configuration described hereafter is disclosed in US 2005/0076059A (conventional technique 2). As regards a business process tracking apparatus, its object is to make it possible to trace a flow of a business process formed of a plurality of applications conducted across different business systems without changing existing systems. In order to achieve this object, in the conventional technique 2, an event manager 1 collects event data extracted by event extractors 32 to 52 in respective business systems A3 to C5 on the basis of event extraction definition, and queues on an event queue 12. An event association unit 13 puts event data together by taking business data as a unit, conducts association between business data, and stores resultant data in an event management DB (database) 14. If a retrieval condition is input from a user terminal 6, an output unit 16 conducts retrieval in the event management DB 14 in accordance with the retrieval condition, outputs association between business data to the user terminal 6 in a tree form and displays it.

SUMMARY OF THE INVENTION

In the conventional technique 1, however, a process of reception, a process of transaction condition confirmation, a process of transaction settlement and a process of result transmission are executed serially with respect to one piece of order information. In the case where the amount of transactions increases such as the case where orders of a specific issue concentrate, therefore, the transaction process does not flow smoothly. In some cases, the system is shut down. In the conventional technique 1, such a problem occurs.

In accordance with the present invention, therefore, the so-called transaction (a plurality of transaction requests) is divided into predetermined units and processes (including sub business units for processes) are executed in parallel. The present invention includes ensuring the sequence when such division is conducted. For example, the present invention includes storing the process advance situation in the database every process and every step. The predetermined units include issues, terminals, markets and servers.

More specifically, the present invention provides a transaction system connected to a plurality of transaction terminals which respectively belong to some of a plurality of groups and which transmit transaction requests, the transaction system conducting security transaction processing according to the transaction requests, the transaction system including an acceptor (server) provided for each of the groups, the acceptor including a unit for accepting a transaction request containing a transaction issue, and a unit for determining whether an accepted transaction request has been received normally and a unit responsive to normal reception for transmitting a reception result to a transaction terminal that has transmitted the transaction request and storing the transaction request in a requirement database, a plurality of transaction processors (servers) respectively associated with security transaction issues, each of the transaction processors including a unit for extracting a transaction request corresponding to a transaction issue of itself from the requirement database, and a unit for registering the extracted transaction request in the requirement database as a transaction acceptable state, and a plurality of contract processors (servers) respectively corresponding to security transaction issues, each of the contract processors including a unit for accepting a second transaction request according to a transaction request registered as the transaction acceptable state, with respect to a transaction request according to a transaction issue of itself included in transaction requests registered in the requirement database, a unit for making a decision whether contract processing is possible in the transaction request and the second transaction request, and a unit for registering a transaction request that reflects a result of the contract in the requirement database, wherein the transaction system is capable of executing a plurality of security transactions in parallel. The present invention includes devices (servers) included in the system, a method, and a program for implementing the system as well.

In addition, the present invention includes the following configuration as well.

It is also included to add paired information in an acceptor so as to accomplish the correspondence relation between each transaction terminal and a group and use the paired information. The paired information includes information that identifies each issue and information that indicates correspondence relations of issue groups.

The conventional technique 2 is intended for the work flow and aims at grasping (tracing) the business process. In other words, how to recover when processing to be executed in each processor is not conducted is not especially considered in the conventional technique 2. In the conventional technique 2, therefore, predetermined business cannot be recovered efficiently when the processing in the processor is stopped. Especially in the case where a certain device issues a processing request (which loses validity when a predetermined time has elapsed) and processing is triggered by the processing request and executed, a problem of accumulated unprocessed cases occurs. In addition, if unprocessed cases are accumulated in this way, not only hardware resources such as storages are wasted, but also a system including these hardware resources stops and a business itself including transactions is suspended.

Therefore, the present invention further includes the following configuration. In other words, if there isn't information concerning a processing request directed to itself and there is a case or requirement information to be processed as the actual state, then request information is issued to itself and the processing is started. In the present invention, it is also included to handle separately information concerning a processing request and requirement information corresponding to the information concerning the processing request and required to execute the processing. It may be judged whether there is a case to be processed as the actual state according to whether the requirement information is present.

More specifically, the present invention has the following configuration.

In other words, the present invention provides a transaction system connected to a plurality of transaction terminals which respectively belong to some of a plurality of groups and which transmit transaction requests, the transaction system comprising a plurality of processors, the transaction system conducting security transaction processing according to the transaction requests, wherein the processors comprise first processors for issuing a processing request which is issued to execute at least a part of the security transaction processing and which loses validity sometimes after issuance, and second processors for executing processing according to the processing request, the first processor issues the processing request, and stores requirement information for executing processing corresponding to the processing request and to be executed in response to the processing request in a requirement database, and the second processor determines whether there is an issued processing request, (1) if there is the processing request, the second processor retrieves corresponding requirement information from the requirement database and executes corresponding processing, (2) unless there is the processing request, the second processor conducts retrieval in the requirement database, and conducts retrieval for unprocessed requirement information with respect to processing to be executed by itself, if there is unprocessed requirement information, the second processor issues request information corresponding to presence of unprocessed requirement information to itself, and upon receiving the request information, the second processor acquires corresponding requirement information from the requirement database and executes pertinent processing. Here, the processing request which loses validity a predetermined time after the issuance contains a non-persistent message which is not recovered at the time of a fault of a machine. A processing request that loses validity or that disappears itself a predetermined time later may also be used.

Here, determining whether there is an issued processing request includes determining whether there is a valid processing request. For example, it is also included to detect that an issued processing request is invalidated (inclusive of disappearance of its validity or itself such as timeout). The first processor writes this processing request into a predetermined database (which can be accessed from each processor). This database may be a requirement database. Determining whether there is a processing request for the second processor is executed by accessing the database. At this time, it is possible to provide a flag in the requirement information to indicate processed/unprocessed and execute determination whether there is a processing request by using contents of the flag. It is also possible to adopt a configuration in which a processing request is transmitted to the second processor and requirement information is stored in the requirement database.

The request information issued by the second processor may be a "pseudo" processing request. In other words, the "pseudo" processing request is made the same item as the processing request from the viewpoint of contents, and subject requirement information (processing subject) is input in accordance with requirement information stored in the requirement database. In other words, the second processor extracts unprocessed requirement information to be processed by itself from among requirement information pieces stored in the requirement database, and writes identification information corresponding to the requirement information. Here, the order property may be maintained by using the time stamp function. In other words, the extracted requirement information contains information that indicates the time of request recorded by using the time stamp function, and the order property is maintained by using the information that indicates the time of request.

In addition, it is also included in the present invention to issue request information when timeout (invalidation) is detected.

It is also included in the present invention to execute the following processing. If there is an unprocessed processing request (for example, if invalidation such as timeout is detected), the second processor counts the number of cases of unprocessed requirement information. If the pertinent processing is executed or the corresponding requirement information is acquired, the second processor subtracts 1 from the counted number of cases. The second processor repeats issuance of request information to itself until the number of cases obtained by the subtraction indicates 0.

Here, counting the number of cases may also be conducted as hereafter described. First, requirement information is caused to contain information whether the second processor has already processed it by itself or it is unprocessed. The second processor counts unprocessed requirement information pieces to be processed by itself by using identification information or the like. More specifically, this will be described hereafter. If a "group code" is used as the retrieval condition, totalization is conducted by using a "group code (an identifier identifying a group)" the process takes charge of. If a "key" is used as the retrieval condition, totalization is conducted by using a "group code" the process takes charge of as the retrieval condition and by taking a "key" as the unit. The resultant number of cases is set in a MQ for retransmission (request information). (In the case of "key," as many MQs as kinds of key each including an unprocessed requirement are transmitted). Here, it is possible to previously count the number of unprocessed cases from the contents of the requirement database and record the number (in other words, contents of this recording is made the number of unprocessed cases).

It becomes possible to count the number of cases by erasing processed requirement information, leaving unprocessed requirement information in the requirement database, and counting the number of cases of the remaining requirement information.

It is also included in the present invention that in the above-described configuration at least one of the processing request and the processing information is information that loses validity (invalidation or timeout) a predetermined time later. The processing request and the processing information may be transfer queues.

In addition, the present invention includes application to a configuration in which the so-called transaction (a plurality of transaction requests) is divided into predetermined units and processing operations (inclusive of sub-business units for processing) are executed in parallel.

According to one aspect of the present invention, parallel processing in processing operation inclusive of sub-business units becomes possible and it becomes increase the expansion property of the system. According to another aspect of the present invention, it becomes possible to implement processing recovery more easily.

Other objects, features and advantages of the invention will become apparent from the following description of the embodiments of the invention taken in conjunction with the accompanying drawings.

DESCRIPTION OF THE EMBODIMENTS

Hereafter, embodiments of the present invention will be described with reference to the drawings. Although the embodiments will be described by taking transaction of securities (stocks), the present invention is not restricted to that.

Figure 6:
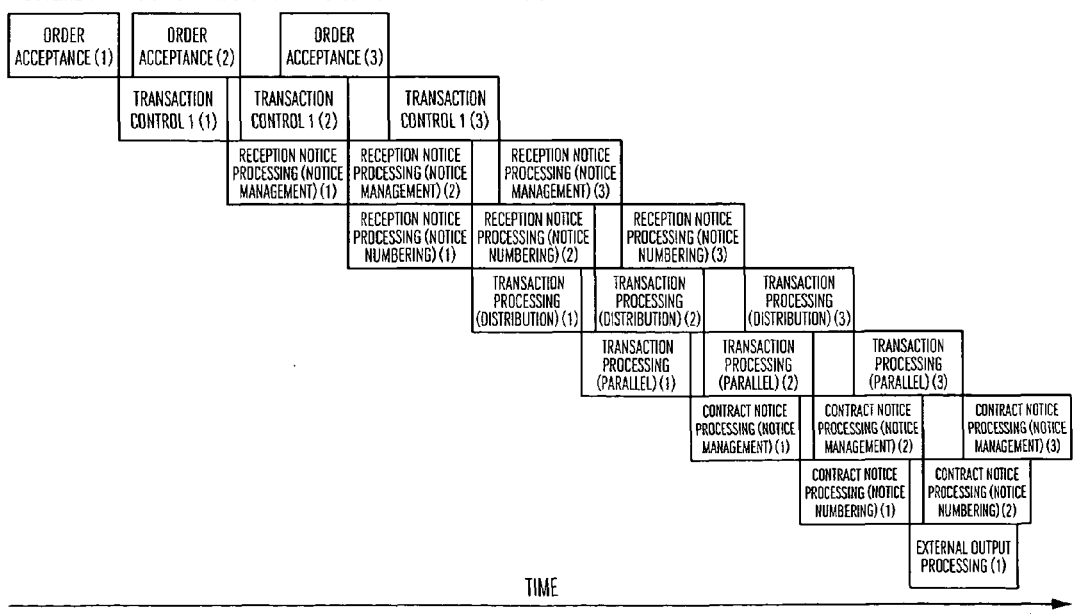
FIG. 6 is a diagram for explaining basic processing contents in the first embodiment of the present invention.

First, basic contents of the present embodiment will now be described with reference to FIG. 6. As shown in FIG. 6, a transaction is divided into sub-business units. As shown in a lower part of FIG. 6, (pseudo) parallel processing such as pipeline processing on the sub-business units is implemented. An example of sub-business is shown in an upper part of FIG. 6.

Figure 12:
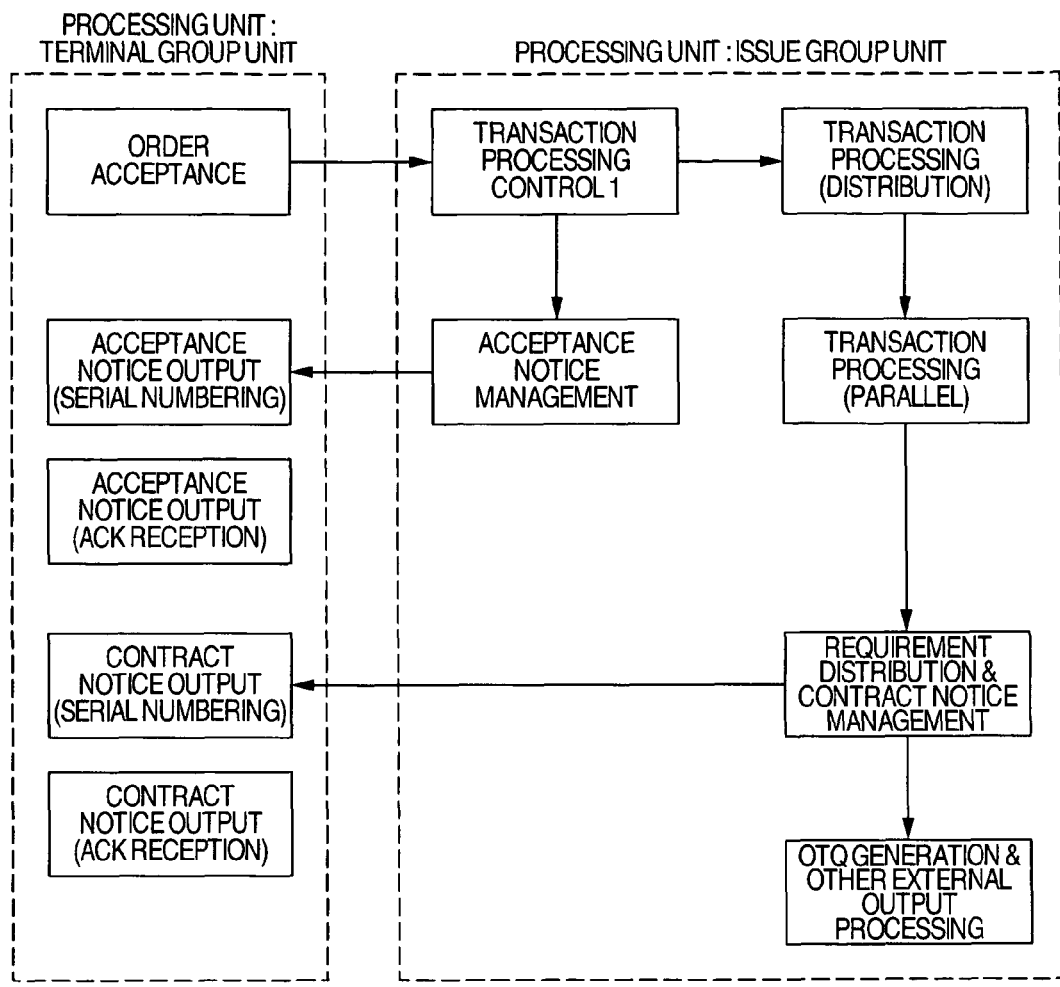
FIG. 12 is a diagram showing a way of thinking of waiting in the first embodiment of the present invention (part one)
Figure 13:
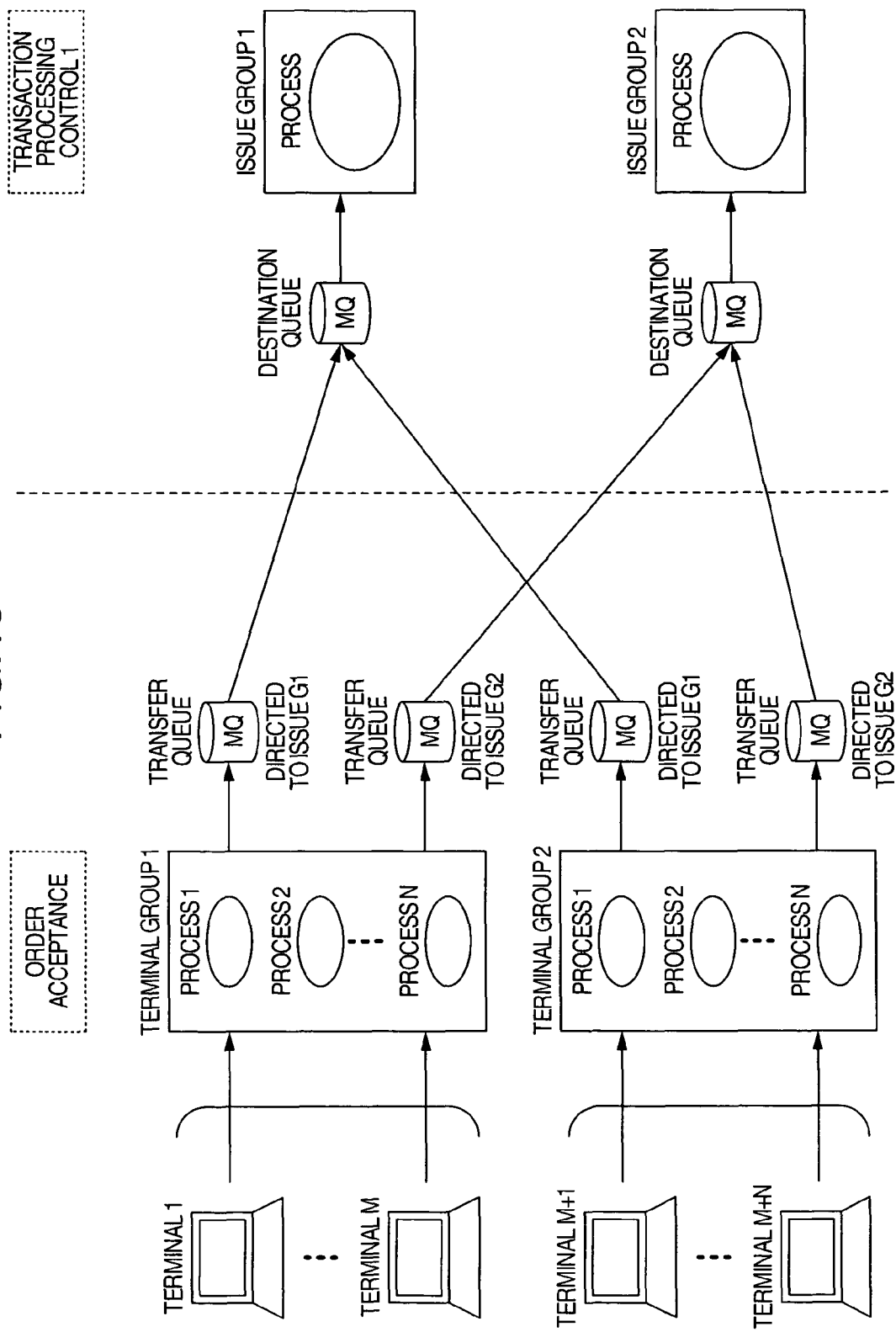
FIG. 13 is a diagram showing a way of thinking of waiting in the first embodiment of the present invention (part two)

An outline (way of thinking) of the present embodiment will now be described with reference to FIGS. 12 to 14. The processing of the present embodiment is premised on the following items. It is necessary to ensure the sequential property of transactions every issue, and it is necessary to manage order acceptances and acceptance/contract notices every terminal, as shown in FIG. 12. On the basis of the above-described requirements, processing units of each processing are determined as shown in FIG. 13.

In this way of thinking, a cause of occurrence of process waiting is considered to lie between processes differing in process unit (for example, such as between order acceptance and transaction process control 1). A way of thinking of waiting between processes differing in process unit will now be described with reference to FIG. 13, by taking the order acceptance and the transaction process control 1 as an example of processes differing in process unit. Since the order acceptance process must be executed by taking a terminal as the unit and the transaction process control 1 must be executed by taking an issue as the unit, the following process contents are supposed.

Order acceptance: it is checked whether the pertinent terminal is under order acceptance in order to prevent a plurality of processes from simultaneously conducting processing given by the same terminal.

The number of processes (the processing multiplex level) for each terminal group can be set.

Transaction processing control 1: the number of processes per issue group is set equal to 1, and serious processing is conducted every issue group.

This control ensures the sequential property for the order acceptance every terminal and for the transaction processing control 1 every issue.

As shown in FIG. 13, the order acceptance and the transaction processing control 1 have different processing units, i.e., terminal and issue, respectively. Therefore, waiting occurs in the cases described hereafter.

Figure 14:
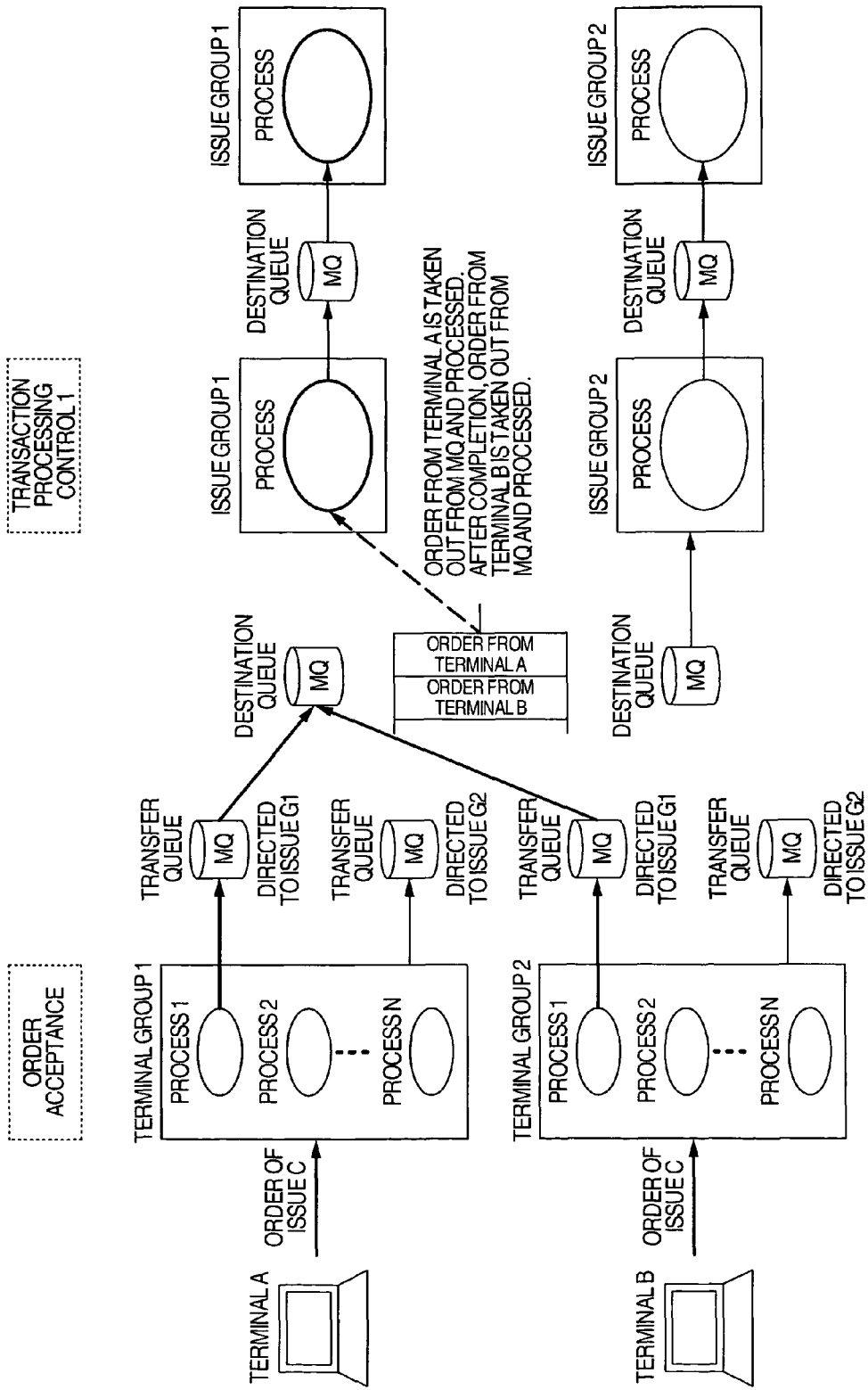
FIG. 14 is a diagram showing a way of thinking of waiting in the first embodiment of the present invention (part three)

The case where a terminal A and a terminal B have ordered the same issue (issue group 1) as shown in FIG. 14 will now be described. In the transaction processing control 1, it is necessary to conduct serial processing every issue. For example, if for the transaction processing control 1 an order from the terminal A arrives earlier and an order from the terminal B arrives later, processing for the order from the terminal B is kept waiting until the transaction processing control 1 for the order from the terminal A is finished. In this way, waiting occurs when taking out the transaction processing control 1 from the MQ.

The waiting time is calculated by supposing that the arrival of orders from terminals follows the Poisson distribution and utilizing the queuing theory on the processing time, process utilization factor and the number of windows (1 in the above-described example). When calculating the response time, evaluation is conducted by considering this waiting time. Its contents will be described later as a second embodiment with reference to FIGS. 8 to 11.

Figure 1:
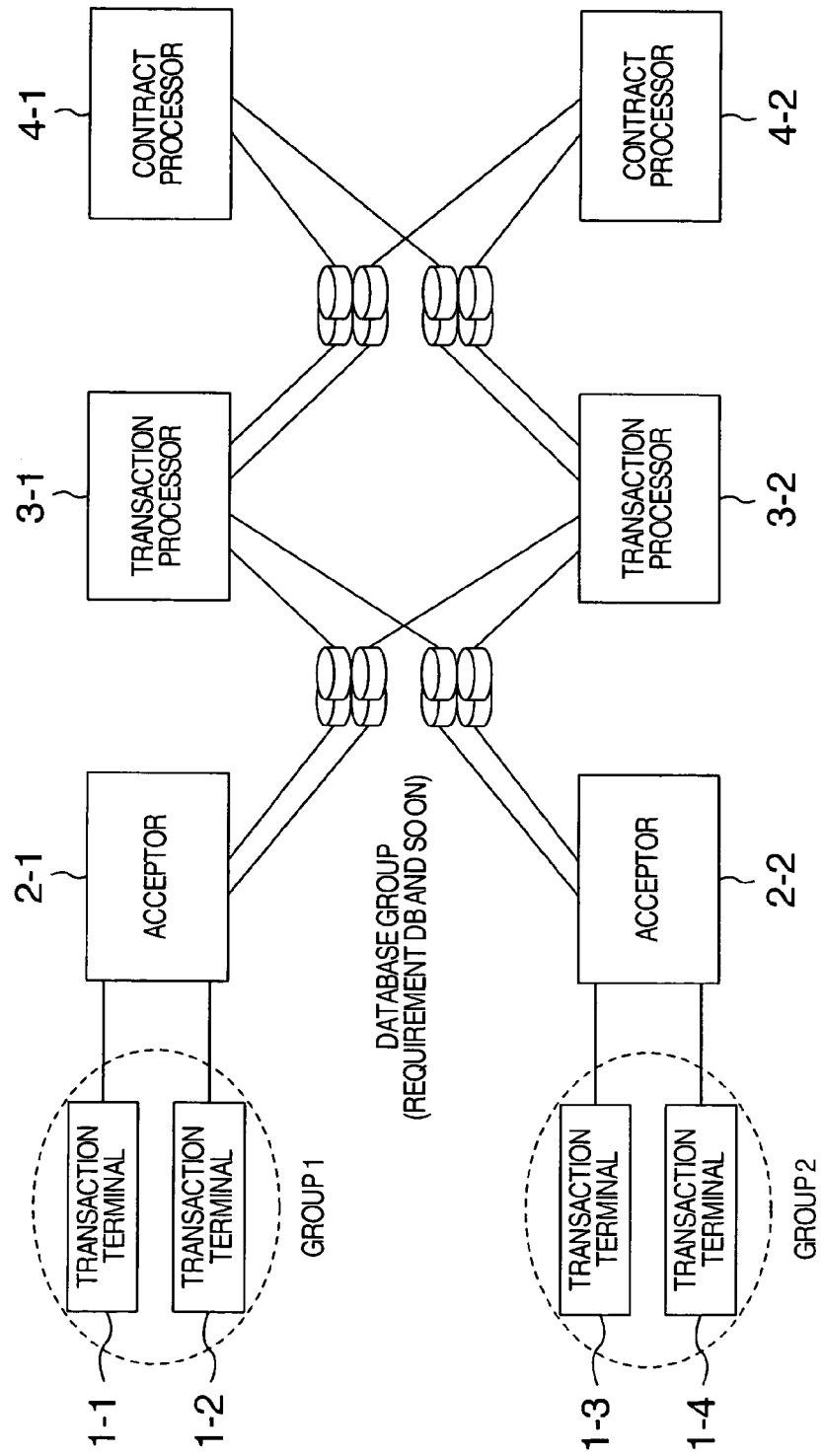
FIG. 1 is a system configuration diagram (1) in a first embodiment of the present invention.
Figure 2:
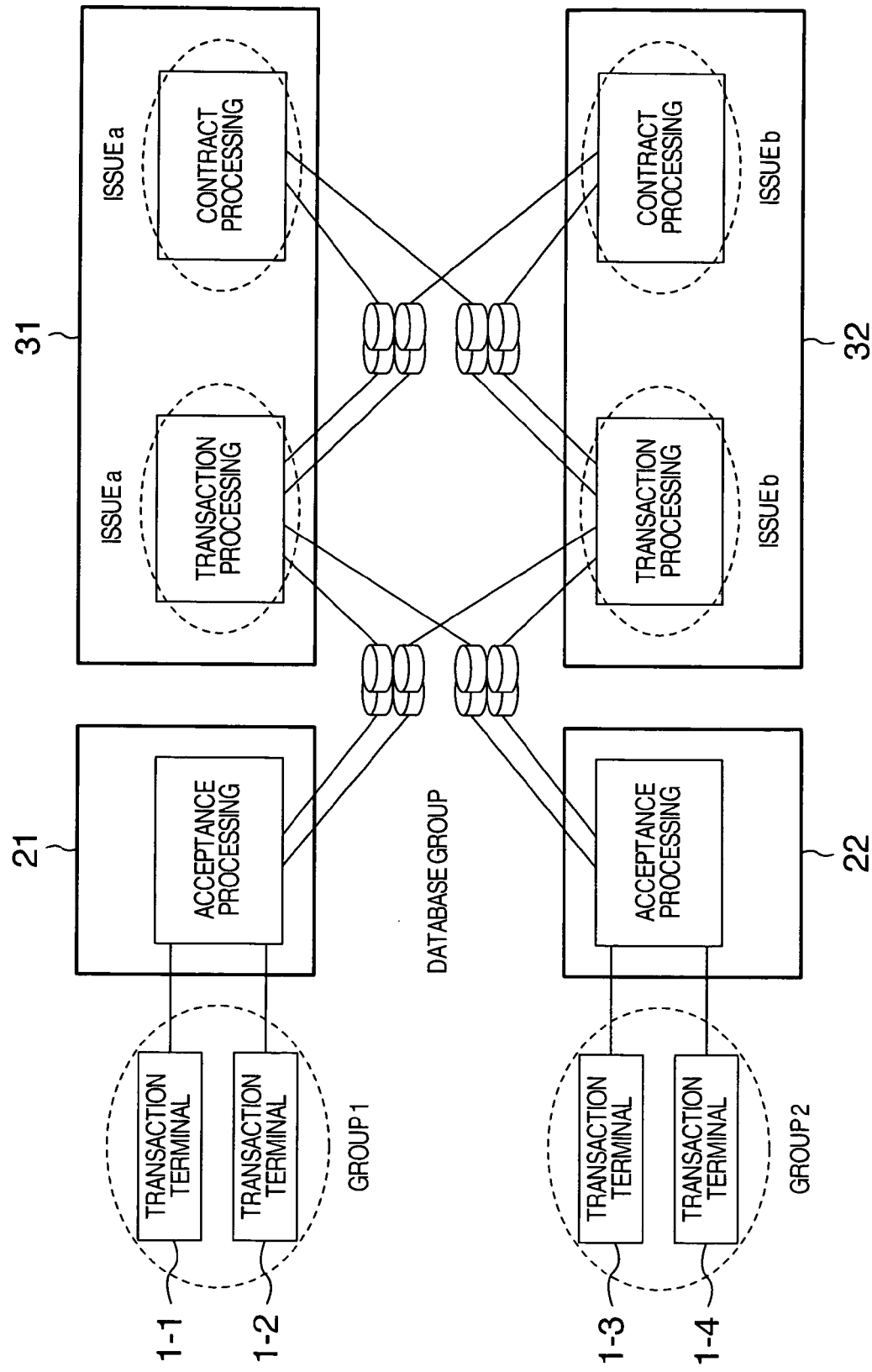
FIG. 2 is a system configuration diagram (2) in the first embodiment of the present invention.

A system configuration diagram in the present embodiment is shown in FIG. 1. Computers are connected to each other via a network. Each computer includes a storage including a memory and a hard disk, and a processor such as a CPU. The processor executes information processing in accordance with a program stored in the storage. As shown in FIG. 1, a system according to the present embodiment includes transaction terminals 1, acceptors 2, transaction processors 3, contract processors 4, and a storage group 5 storing information concerning transactions. Each of the components includes a plurality of components. (1) As for the transaction terminals 1, a plurality of transaction terminals may be put together as a group. (2) It is possible to form the acceptor 2, the transaction processor 3 and the contract processor 4 as a one-body server device in a hardware form and form each of them as software having its function. In the case of (2), the acceptor 2 and the transaction processor 3 may be formed as one body, or the transaction processor 3 and the contract processor 4 may be formed as one body. The present embodiment will now be described by referring to an example in which the contract processor 4 and the transaction processor 3 are formed as one body. In the configuration shown in FIGS. 1 and 2, each acceptor 2 (21 and 22) is associated with a group of transaction terminals (such as a security company). Each transaction processor 3 and each contract processor 4 (or each of processors 31 and 32 obtained by forming them as one body) is associated with an issue to be processed, and it executes processing for an associated transaction request. This association may be retained by software instead of a device, i.e., hardware. In addition, this association may be changed dynamically on the basis of a condition such as a transaction amount. In other words, if transaction requests from a certain group or transaction requests of a certain issue (increase and) arrive at a predetermined number (quantity), a predetermined device (for example, a device or a computer source of the same kind to which the smallest number of transaction requests are issued) may be caused to execute processing of that group (or issue). It is also included in the present embodiment to determine whether the transaction requests (or a calculation quantity caused thereby) satisfy a predetermined relation (a predetermined relation that a difference is at least a threshold or such as 1:10) and change the associations according to the contents (change a device to which a small number of transaction requests are issued to a device to which a large number of transaction requests are issued).

Hereafter, processing contents in the present embodiment will be described.

Figure 3:
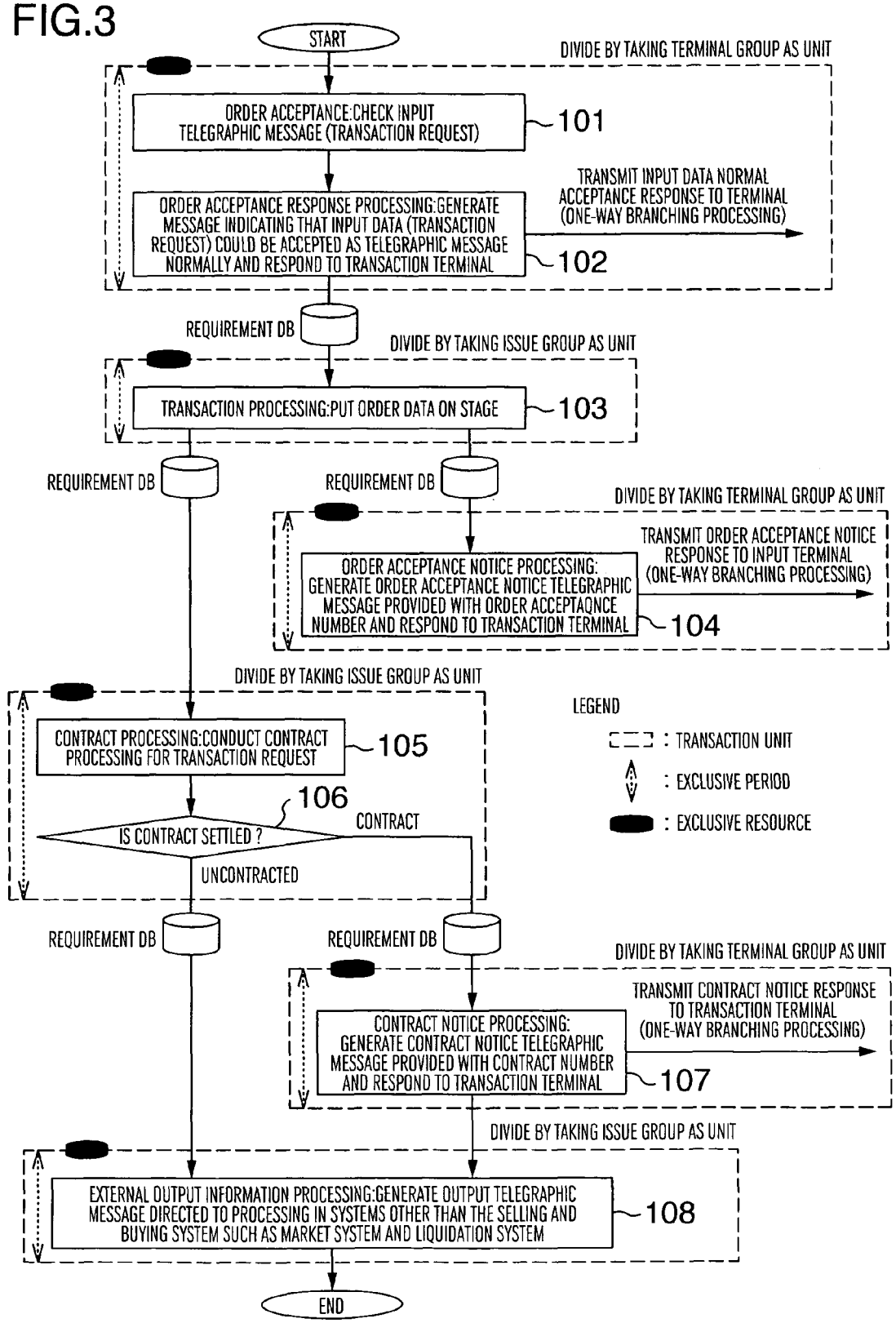
FIG. 3 is a flow chart showing contents of processing in the first embodiment of the present invention.

First, basic processing in the present embodiment will now be described with reference to FIG. 3. FIG. 3 shows a transaction division processing flow (transaction processing outline: transaction division). In this processing, a transaction is divided while ensuring conformity in processing order of terminal group units or issue groups. Exclusion is conducted by taking a terminal group as the unit or taking an issue group as the unit.

At step 101, the acceptors 21 and 22 conducts acceptance for orders given by the corresponding transaction terminals. Here, the acceptor 21 receives a transaction request containing information that identifies a specified issue, whether the order is selling or buying, a desired amount of money, the number of stocks, and a requester (transaction terminal (group)) from the transaction devices. In order to receive a corresponding transaction request, physically mutually corresponding transaction terminals (group) may be connected, or a corresponding acceptor may be specified from a transaction terminal to transmit a transaction request toward the specified acceptor. In addition, filtering processing may be conducted on the acceptor side so as to receive only the corresponding transaction terminal (group).

At the same step 101, the input telegraphic message, i.e., the transaction request is checked. This check is conducted to determine whether normal reception has been conducted under a fault occurrence situation on the communication path.

It is also included in the present embodiment that the acceptor 2 conducts processing hereafter described, at the step 101. First, as a premise, information identifying a requester contained in a transaction request is information specifying a transaction terminal. Here, by using the information as a key, the acceptor 2 retrieves information that specifies a corresponding terminal group from a terminal—terminal group specifying table. The acceptor causes the transaction request to contain the retrieved information and executes subsequent processing. It is also included in the present embodiment to retrieve information that specifies an issue group from an issue—issue group specifying table shown in FIG. 7 by using a specified issue as a key and cause the transaction request to contain the retrieved information. The information thus newly added is used to specify a group (or an issue or a terminal) in each processing.

Figure 7:
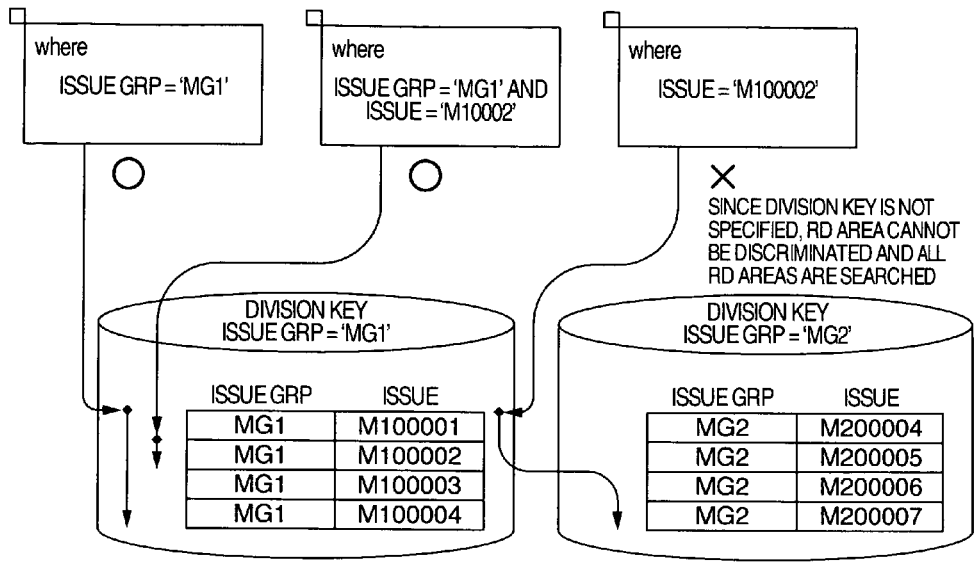
FIG. 7 is a diagram showing a table which records issue— issue group association relations in the first embodiment of the present invention.

In FIG. 7, it is necessary to be able to specify a division key in all applications that access a subject table. This is because it is necessary to specify a division key without fail at the time of retrieval in order to specify a subject RD area. Unless a division key is specified, it is necessary to search all RD areas in which the table is located and this is unsuitable from the viewpoint of performance.

The division key is set according to an application that conducts retrieval with the largest unit among all applications that conduct retrieval in the subject table.

If retrieval using an issue group is conducted on a table divided using internal issue codes, all RD areas in which the subject table is disposed are searched, and consequently the performance is degraded. If there is an application that conducts retrieval by taking an issue group as the unit and an application that conducts retrieval by taking an issue as the unit, then in an application that conducts retrieval by taking an issue as the unit and using an issue group code as a division key it is necessary to conduct retrieval on condition of an issue group code and an issue code.

Return to FIG. 2. Each acceptor advances to step 102, and transmits a result of the check conducted at the step 101 to the transaction terminal that has transmitted the transaction request. If the transaction request is judged to have been received normally, the acceptor transmits a normal acceptance response to the transaction terminal. The acceptor stores the received transaction request in a requirement DB 51. In this case, the acceptor stores a transaction situation in association with each transaction request. Here, information that indicates "acceptance" is stored. In addition, the information may be stored in a corresponding requirement DB every "transaction issue" contained in the transaction request. For example, a transaction request for an issue "a" is stored in a requirement DB 51-*a*. The requirement DB is stored in a storage group 51. Requirement DBs 51 (51-*a* and 51-*b*) may be stored in physically the same medium.

Subsequently, at step 103, each of the transaction devices 31 and 32 extracts transaction requests for an "issue" having "acceptance" as the transaction situation and corresponding to itself, from the requirement DB 51 (by using a transaction processing program). This extraction may be implemented by transmitting a transfer queue from the acceptor to a corresponding processor 31 or 32 every "transaction issue" concurrently with registration into the requirement DB 51 (when at least a predetermined number of the same contained issues have been registered). The processor 31 or 32 may conduct retrieval whether a transaction request for "acceptance" has been issued to a requirement DB 51 corresponding to itself at predetermined timing including at predetermined time intervals, to conduct the extraction. Or the processor 31 or 32 may conduct retrieval in the requirement DB by using reception of information indicating that registration has been conducted from an acceptor as a trigger, to conduct the extraction. This triggering may be executed by detecting that the number of transaction requests for the same "issue" has become at least a predetermined number. As for registration into the requirement DB, registration into requirement DBs respectively for "issues" may be conducted (the same shall apply hereinafter).

And processing of the so-called putting the extracted transaction requests on the stage is executed. In other words, transition to a state in which transaction is possible is conducted. Details of this processing will be described later with reference to FIGS. 4 and 5. If this processing is executed, registration is conducted to change the requirement DB transaction situation from "acceptance" to "transaction."

Subsequently at step 104, each of the transaction devices 31 and 32 adds an order acceptance number identifying a transaction request and stores the transaction request in the requirement DB. Upon being triggered by this registration, time or the number of registrations, each acceptor gives a notice of the order acceptance number to a transaction terminal that has transmitted a transaction request corresponding to itself in "transaction terminal (group)" and "transaction" on the basis of the requirement DB.

Subsequently, at step 105, each of the transaction devices 31 and 32 extracts a transaction request in which the transaction situation is "transaction" and the "issue" corresponds to itself from the requirement DB 51 (by using a contract processing program). This extraction may be executed by processing similar to the step 103. And each of the transaction devices 31 and 32 executes "contract processing" for the extracted transaction request. In other words, each of the transaction devices 31 and 32 detects whether there is a transaction request which corresponds to the extracted transaction request (which is opposite in selling/buying and which corresponds to the price and the number of stocks). Since this processing is conducted usually, detailed description thereof will be omitted.

Subsequently, at step 106, each of the transaction devices 31 and 32 determines whether a contract is settled in the contract processing at the step 105 (whether a corresponding transaction request has been detected, by using the contract processing program). This result is stored in the requirement DB in association with a corresponding transaction request. If the contract is settled, the processing proceeds to step 107. If the contract is not settled, the processing proceeds to step 108. By the way, if the contract is settled, "transaction" in the requirement DB is changed to "contract." If the contract is not settled, "transaction" is changed to "uncontracted."

Subsequently, at step 107, upon being triggered by this registration, time, or the number of registrations, each acceptor transmits a contract notice, which contains a contract number specifying a contract, to a transaction terminal that has transmitted a transaction request that corresponds to itself in "transaction terminal (group)" and that is "contrast" in transaction situation obtained from the requirement DB. And each acceptor proceeds to step 108.

Subsequently, at step 108, each of the transaction devices 31 and 32 creates external output information to be transmitted to a market system which is not illustrated, and transmits the external output information. Here, each of the transaction devices 31 and 32 extracts transaction requests that correspond to itself in "issue" and that are "contract" or "uncontracted" in transaction situation, and executes this processing on them.

Details of the processing conducted at the steps 101 to 103 (especially 103) will now be described with reference to FIGS. 4 and 5. First, an example of the case where transaction processing transfer can be conducted normally will now be described with reference to FIG. 4. Data transfer between transactions is conducted via DBs and MQ. In the example (between order acceptance processing and transaction processing) shown in FIG. 4, data cooperation between transactions is conducted via a requirement DBa. The response is shortened by starting subsequent transactions with an MQ trigger event.

First, details of the steps 101 and 102 will now be described. The steps 101 and 102 (i.e., the detailed processing described hereafter) are executed by taking "group" as the unit. This has been described earlier.

At step 1011, a transmitted transaction request is received. At step 1012, an input telegraphic message, i.e., a transaction request is checked. This check is conducted to determine whether normal reception has been conducted under a fault occurrence situation on the communication path. If the reception is judged not to be normal, the processing proceeds to step 1021. If the reception is judged to be normal, the processing proceeds to step 1022.

At step 1021, the transaction terminal that has conducted transmission is notified of an error (notified that reception cannot be conducted normally). At step 1022, registration is conducted in the requirement DB provided for each of the received transaction requests and "issue." In other words, registration into a requirement DB corresponding to "issue" in the received transaction request is conducted. At this time, "acceptance" is changed to "transaction" and registration is conducted.

Subsequently at step 1023, the transaction terminal is notified that the reception has been conducted normally. At step 1024, a transfer queue (MQ) is generated to be used as a processing trigger in the transaction device 31 or the like. Here, the transfer queue (MQ) may be generated every "issue." The generation of the transfer queue (MQ) (or notice to the processor) may be executed at predetermined timing including at predetermined time intervals or detecting that registrations in the requirement DB in the acceptor (inclusive of transaction requests for the same "issue") have become at least a predetermined number as described above.

Details of the step 103 will now be described. The step 103 (i.e., detailed processing described hereafter) is executed by taking "issue" as the unit as described above. At step 1031, transaction information of the issue corresponding to itself is extracted from the requirement DB. At step 1032, confirmation processing is executed to determine whether there is an omission in items of the extracted transaction requests and whether the quantity corresponds to the number of issuances.

If it is judged at step 1033 that an error has occurred (i.e., the order condition is not normal), then the processing proceeds to step 1034 and error processing is conducted. In other words, the transaction terminal is notified of the error.

If the order condition is judged to be normal, the processing proceeds to step 1035. At the step 1035, "stage registration processing" is conducted. It is included in a mode of the stage registration processing to set a flag in the requirement DB to indicate that transaction is possible. It is also included in a mode of the present embodiment to conduct registration into an order acceptance & stage DB. In addition, a combination of them may be used.

Subsequently, at step 1036, it is registered in a requirement DB of the corresponding "issue" that the stage registration processing has been executed. The processing proceeds to step 1037, where the transaction terminal is notified that an order has been accepted normally. At step 1039, the transfer queue (MQ) is generated to be used as a processing trigger in the transaction device 31 or the like, in the same way as the step 1024. Here, the transfer queue (MQ) may be generated for each "issue." The generation of the transfer queue (MQ) (or notice to the processor) may be executed at predetermined timing including at predetermined time intervals or detecting that registrations in the requirement DB in the acceptor (inclusive of transaction requests for the same "issue") have become at least a predetermined number as described above.

Processing conducted in the case where the transaction processing transfer has finished abnormally (in the case where the processing has finished abnormally in the middle of the step 103) will now be described with reference to FIG. 5. Basically, processing similar to that shown in FIG. 4 is executed. If abnormal termination is detected, that processing request is executed again. Specifically, the processing request is implemented by reading the same data as the transaction request that has finished abnormally from the requirement DB.

A plurality of kinds of requirement DB may be prepared for respective issues, respective groups or the like as described above. In this case, control is exercised to change the transaction situations of other requirement DBs so as to match mutual information pieces upon being triggered by a change in the processing situation (such as a change from "acceptance" to "transaction" in a certain requirement DB).

Figure 4:
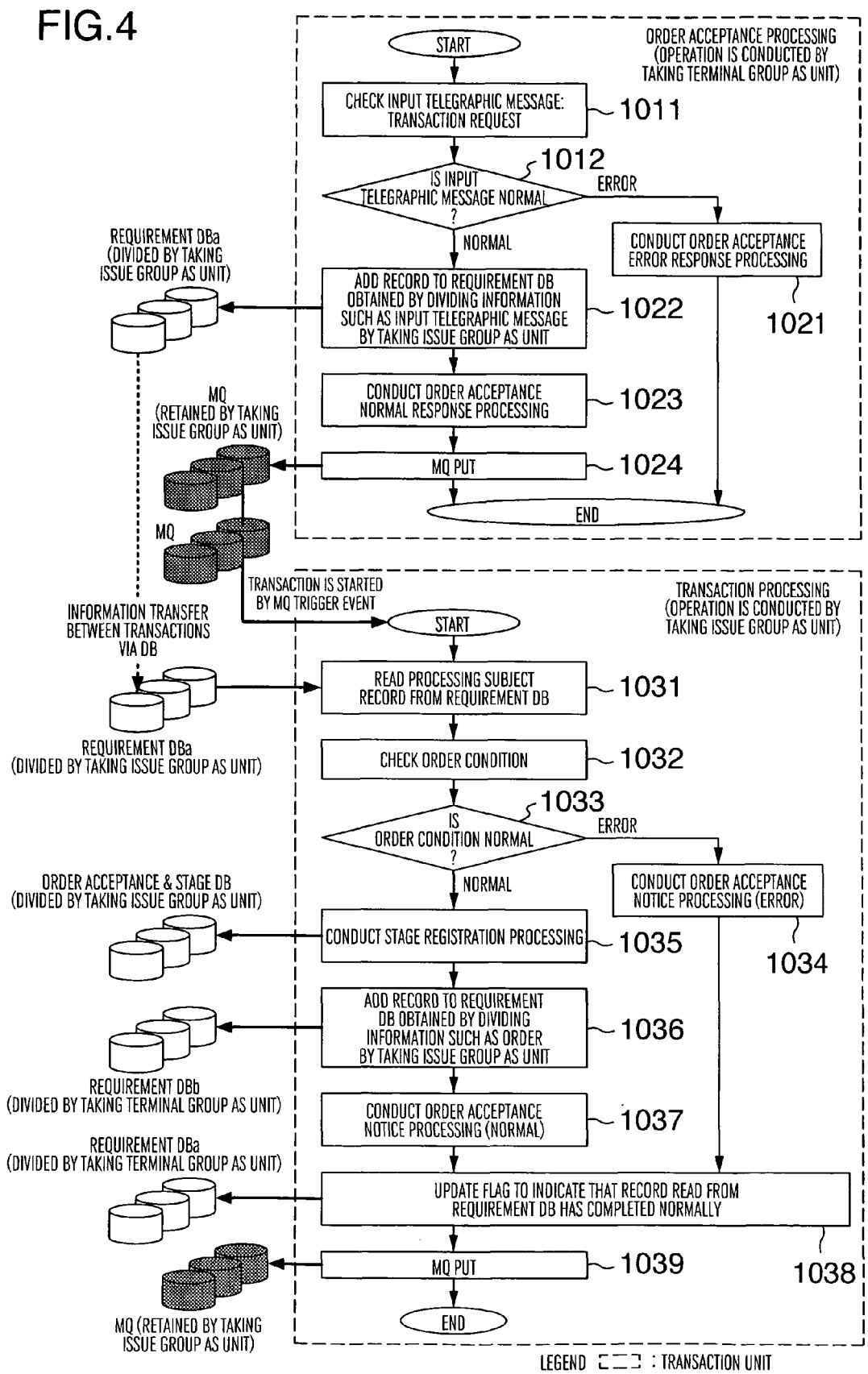
FIG. 4 is a flow chart (normal) showing detailed processing of steps 101 to 103 in FIG. 3.
Figure 5:
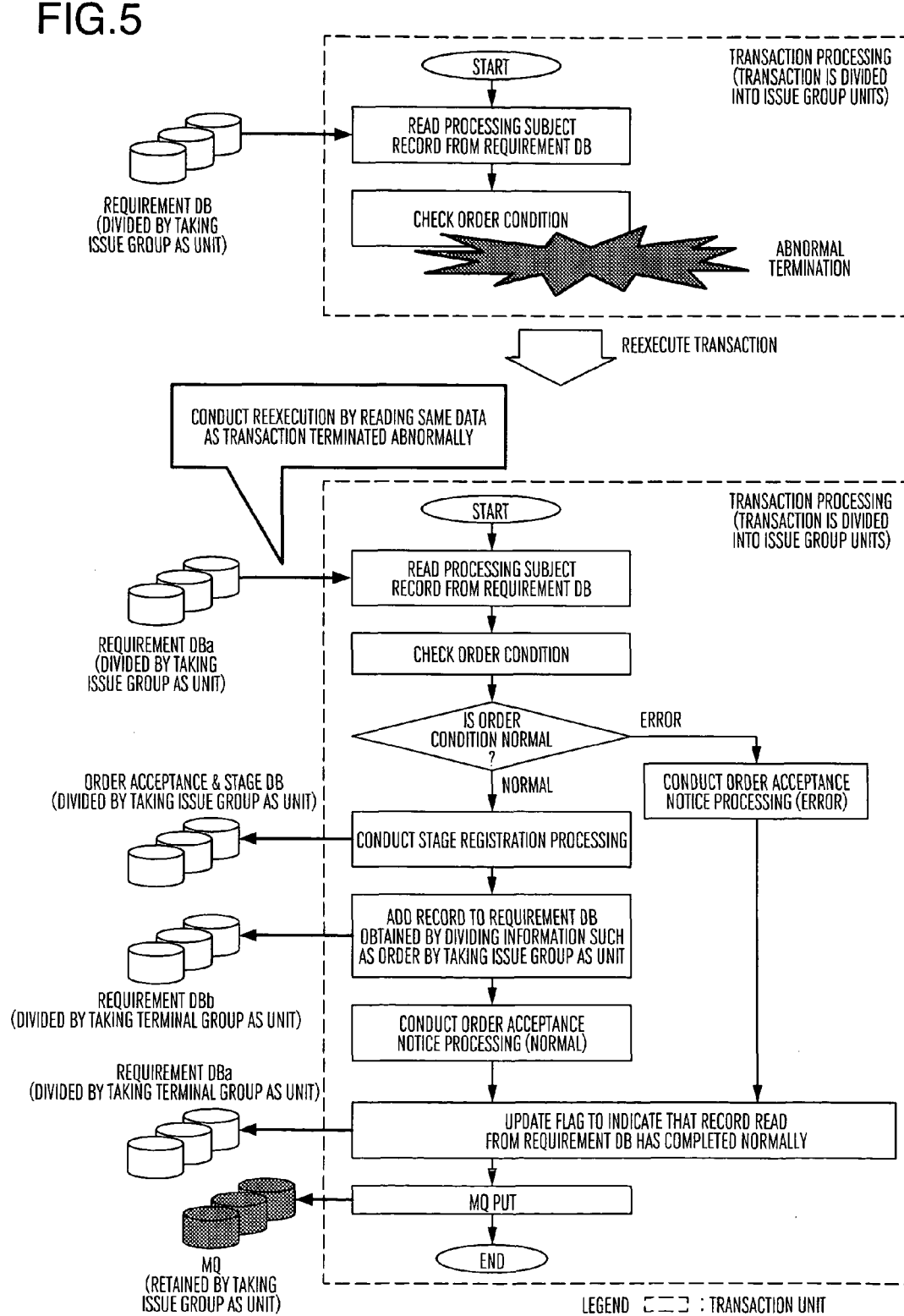
FIG. 5 is a flow chart (abnormal termination) showing detailed processing of steps 101 to 103 in FIG. 3.

As for the database group, a database for achieving cooperation among processing operations shown in FIGS. 4 and 5 may be provided. Databases such as requirement DBs include the following DBs.

Requirement DB: Database for storing data to achieve cooperation among transactions of fundamental APP Requirement DB (acceptance→transaction): DB for data cooperation between "acceptance processing→transaction processing"

Requirement DB (transaction→contract): DB for data cooperation between "transaction processing→contract processing"

Requirement DB (contract→transaction): DB for data cooperation between. "contract processing→transaction processing"

Requirement DB (transaction→acceptance): DB for data cooperation between "transaction processing→acceptance processing"

Business DB: Database needed in business

Order acceptance & stage DB: Results of transaction processing device are stored Order history DB: Results of contract processing device are stored Owing to the embodiment of the present invention heretofore described, it also becomes possible to improve the throughput by (pseudo) parallel processing such as pipeline processing.

It also becomes possible to cope with an increase of the amount of transaction (computation) by adopting the embodiment (distributed processing using grouping) heretofore described and implementing vertical expansion conducted by installing more processors (transaction processors 3 and contract processors 4). It becomes possible for the acceptors 2 to cope with an increase of the amount of transaction (computation) by horizontal expansion conducted by adding (enhancing) processors (CPUs). The present invention is not limited to such expansions, but, for example, the transaction processors and the acceptors may be subjected to the so-called vertical expansion and horizontal expansion, respectively. Or all of them may be subjected to the vertical expansion or all of them may be subjected to the horizontal expansion.

A second embodiment of the present invention will now be described with reference to FIGS. 8 to 11.

Figure 10:
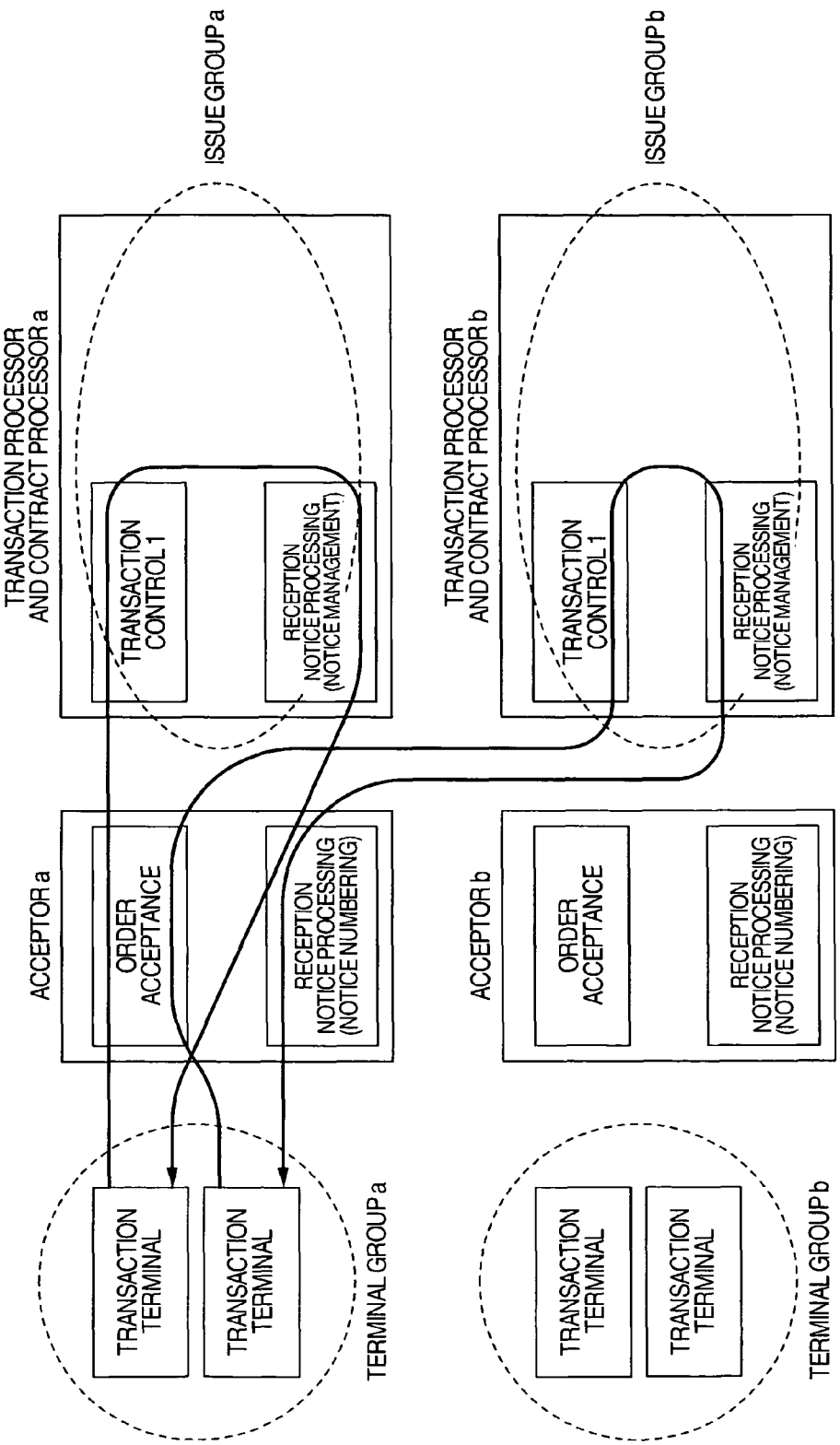
FIG. 10 is a diagram showing response information subject processing for each terminal.
Figure 11:
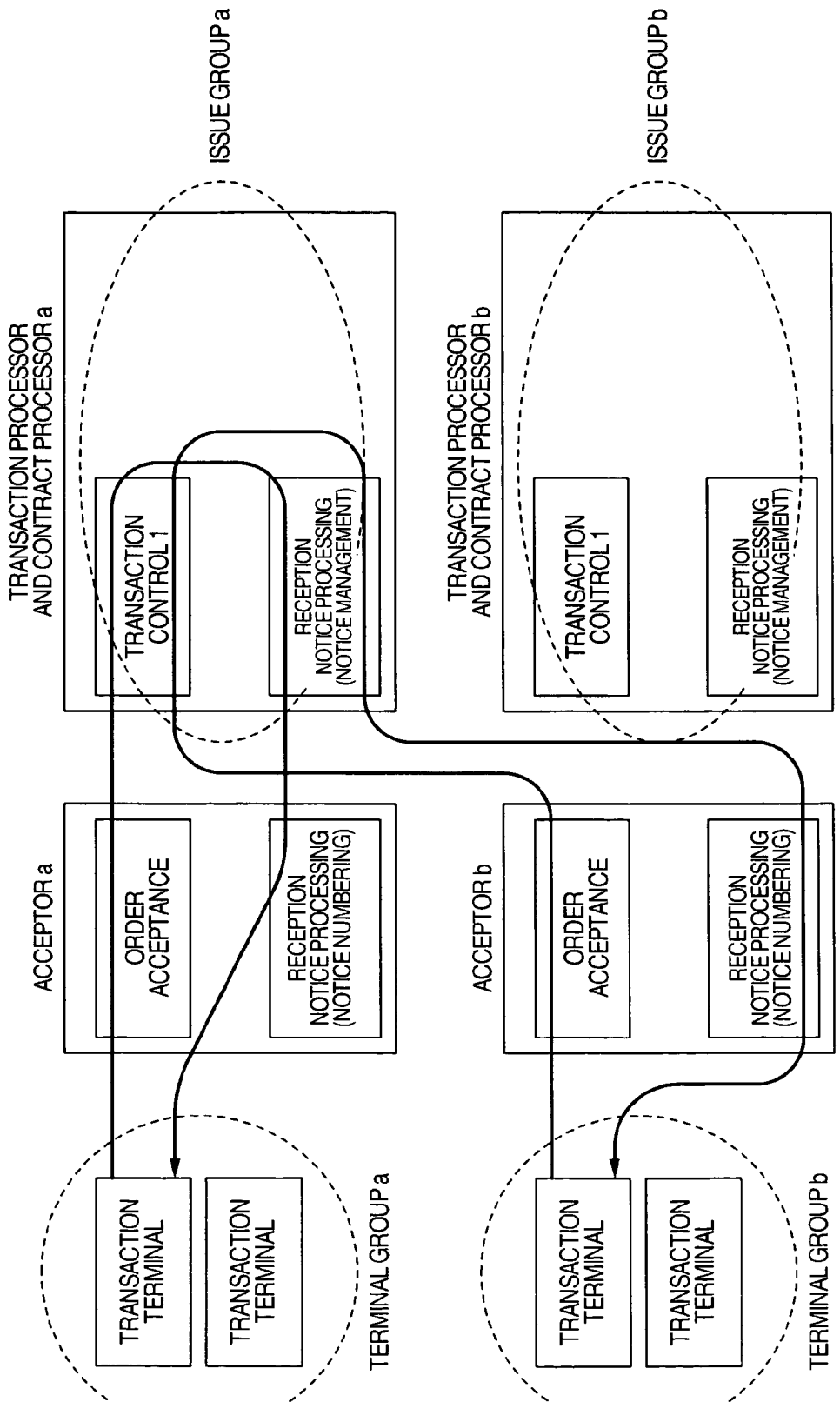
FIG. 11 is a diagram showing response information subject processing for each issue.

In the second embodiment, the response time in the case where distributed processing is conducted in the first embodiment is calculated. If distributed processing is conducted as in the first embodiment, the response time for each transaction request cannot be known immediately. This is because each sub business processing is not executed by one device as shown in FIGS. 10 and 11 and consequently it becomes difficult to calculate the time. The response time means time between order acceptance and the reception notice or the contract notice as shown in FIG. 8.

Figure 8:
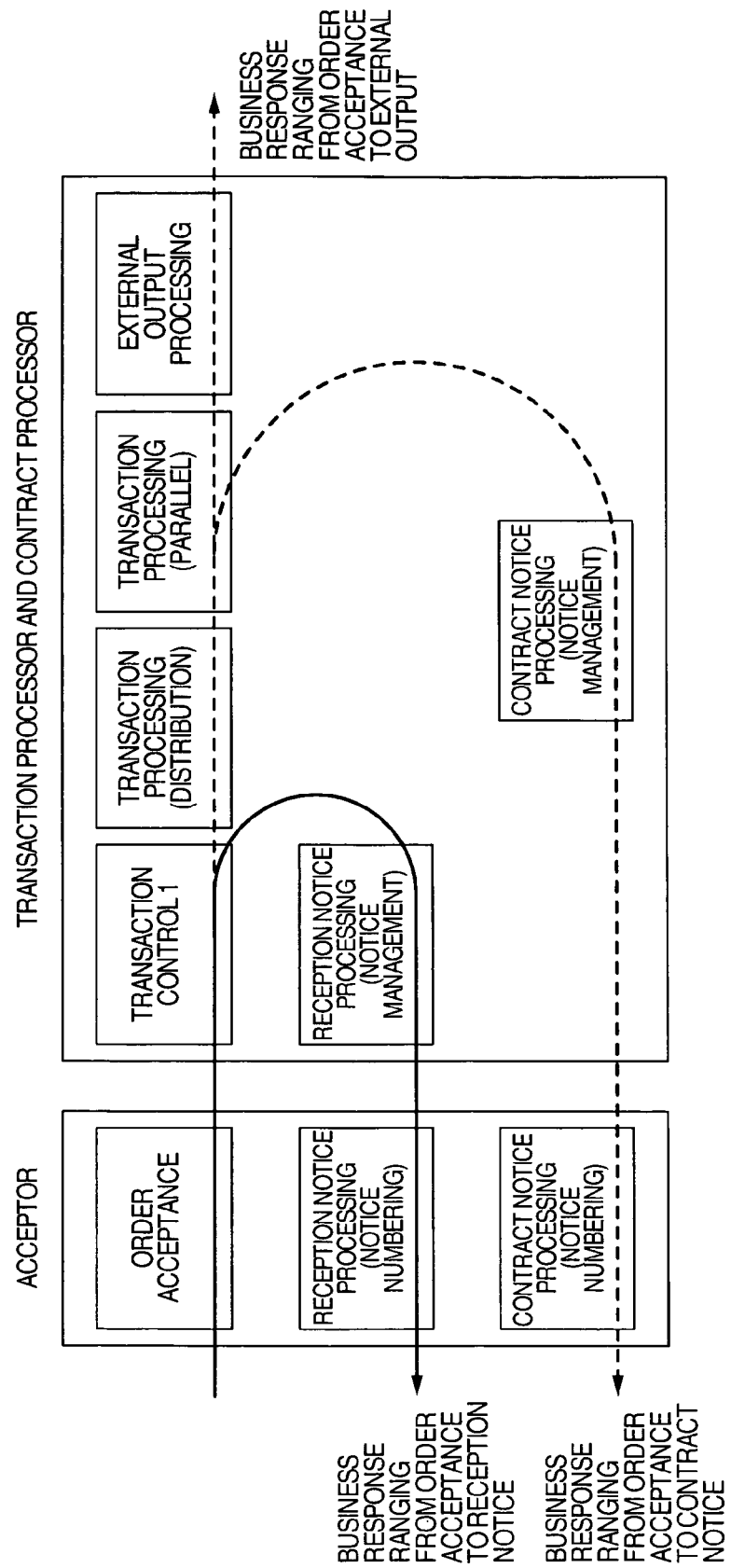
FIG. 8 is a diagram showing a concept of response information in a second embodiment of the present invention.

In an example shown in FIG. 8, sub-businesses distributively executed in a plurality of processors are joined together as one order reception notice business, and edited as business response information.

In the present embodiment, control is exercised so as to join sub-businesses distributively executed in a plurality of processors together as one order reception notice business, and create business response information. In other words, among sub-businesses, start time of the first sub-business and end time of the last sub-business are recorded, and a difference between them is calculated as a response time. When recording time, information identifying the transaction (acceptance NO.) is recorded in association.

Figure 9:
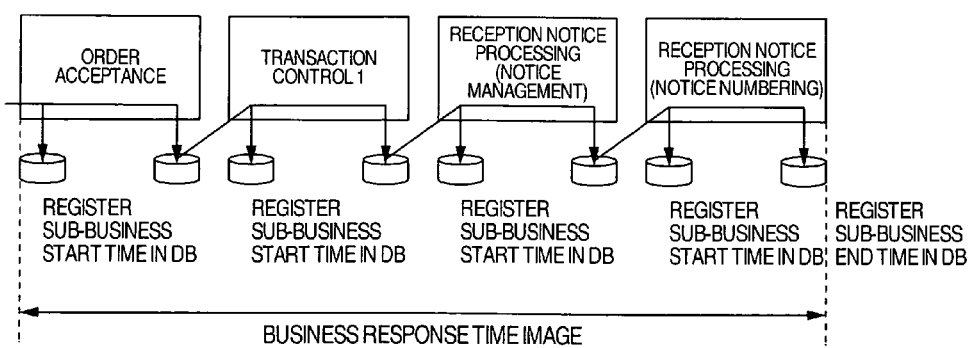
FIG. 9 is a diagram showing a time image of response information.

It is also possible to record end time as well in the last sub-business besides start time of each sub-business as shown in FIG. 9. In this case, it becomes possible to extract a necessary sub-business on the basis of specification and calculate a response time of the sub-business (inclusive of a plurality of sub-businesses). More specifically, processing described hereafter is executed. The sub-business start time and acceptance number of the order acceptance are registered in the DB. In subsequent processing, the sub-business start time and acceptance number are registered in the DB. In a sub-business "reception notice processing" executed lastly in one order reception notice business, sub-business end time after response to the transaction terminal is registered in the DB besides the sub-business start time and the acceptance number. It is possible to calculate a response for the order reception notice business on the basis of a difference between start time of head sub-business "order acceptance" and end time of last sub-business "reception notice processing" by using an acceptance number corresponding to one order reception notice business as a key.

In addition, it is possible to edit response information by terminal (terminal group) or issue (issue group). As a result, it is possible to grasp a bottleneck location by taking a terminal group as the unit or an issue group as the unit. It is possible to conduct suitable resource assignment and evaluation.

A third embodiment of the present invention will now be described with reference to the drawings. Although the present embodiment will be described by taking transaction of securities (stocks), the present invention is not restricted to that (it is also included in the present invention to apply the embodiment to other businesses).

First, basic contents of the present embodiment will now be described.

(1) Typically, a processing request (example: MQ "transfer queue" is transmitted from a liaison source process (for example, an acceptor 2 shown in FIGS. 1 and 2) to a liaison destination process (for example, a transaction processor 3 shown in FIGS. 1 and 2). Here, the transmission destination is a device or hardware. In the present embodiment, however, the hardware may be different or may be the same. It is necessary only to transmit registration of a requirement database and a processing request (MQ) from a certain process (processing program) to a process of processing request destination. For example, there are as many processes "order acceptance" as terminal groups, and as many "transaction processing control 1" processes as the issue groups are in operation. The "transaction processing control 1" is fastened to an "issue group" which is a set of a plurality of issue keys. One process is specified by a combination of the function name "transaction processing control 1" and an issue group. A server and a group may be provided with one-to-one correspondence, or a plurality of groups may be disposed in a server.

(2) Upon receiving an MQ in the liaison destination process, one piece of requirement information (record) is acquired (selected) from a requirement DB corresponding to the MQ. As for the method for acquiring this, there are the following methods: (a) the acquisition is conducted by using a identifier (such as a group code) that identifies a "group" of itself (or itself) (each of the MQ and the requirement is caused to contain a group code); and (b) the acquisition is conducted by using an identifier that identifies an issue of transaction subject (each of the MQ and the requirement is caused to contain an identifier that identifies an issue). The requirement information is caused by using a time stamp function to contain time information which represents time when the process of liaison source process executed issuance of a processing request (or it may be predetermined processing such as transmission or processing on the requirement information). The order of acquisition is determined in accordance with the order of time information. For example, acquisition is conducted in the order of becoming later.

If the MQ is invalidated by, for example, timeout (or invalidation is detected), the liaison destination process conducts retrieval in the requirement database and detects whether there is an unprocessed case (for example, requirement information). This detection is conducted in the same way as the method described in (2) above. Hereafter, it will be described in more detail. Both the requirement database and the processing request (MQ) are provided with a "group code" of the processing request destination and a "key." Upon acquiring a message (MQ) by using MQGET, the liaison destination process confirms that the message is directed to the own process, and then retrieves a requirement record that is the oldest in registration time from the requirement database under a retrieval condition that the "group code" or "key" is the same and the record is unprocessed.

The MQ is a trigger for conducting retrieval in the requirement database. In other words, it is not necessary for the MQ to indicate "what to do." "What to do" is registered in (requirement information in) the requirement database. Information specifying, for example, corresponding order data (recorded in an order reception database or the like) is set in the requirement database. Therefore, it becomes possible to conduct processing on the order reception database in the order of acquisition of the requirement databases (for example, the sequential property in processing of orders in the same issue required in the exchange is ensured).

(3) In the liaison destination process, a program for executing processing that corresponds to the acquired requirement information is started, and the processing is executed. A notice is sent to the next process (for example, the contract processor).

It becomes possible to achieve the following effects by combining the present embodiment with distributed processing.

(1) It becomes possible to conduct "processing sequential property insurance" which is a business requirement. Since the sub-business is divided with a flow such as "terminal group: n→issue group: m→terminal group: n", insurance of the processing order becomes a problem. However, records are processed in order beginning with the oldest unprocessed record in the requirement DB. As a result, processing sequential property insurance (with an issue group taken as the unit) becomes possible (processing requests are generated from n terminal groups with respect to a requirement DB for an issue group 1).

(2) It becomes possible to limit subject resources of recovery from a fault only to DBMS. In XA cooperation (two-phase commit) having recovery subject resources in both the transaction monitor and the DBMS, the commit processing performance becomes long. Therefore, it becomes possible to limit the recovery subject resources only to DBMS, use non-XA cooperation, and ensure the commit performance. It is a case of course that the present invention can be also applied to the case where XA cooperation is conducted.

(3) The sequential property insurance at the time of recovery becomes possible. It becomes possible to ensure the sequential property after the recovery from the fault as well by using the function of (1) (conducting processing in order beginning with the oldest unprocessed record in the requirement DB).

It is also included in the present invention that distribution is not conducted by taking a sub-business as the unit.

Figure 15:
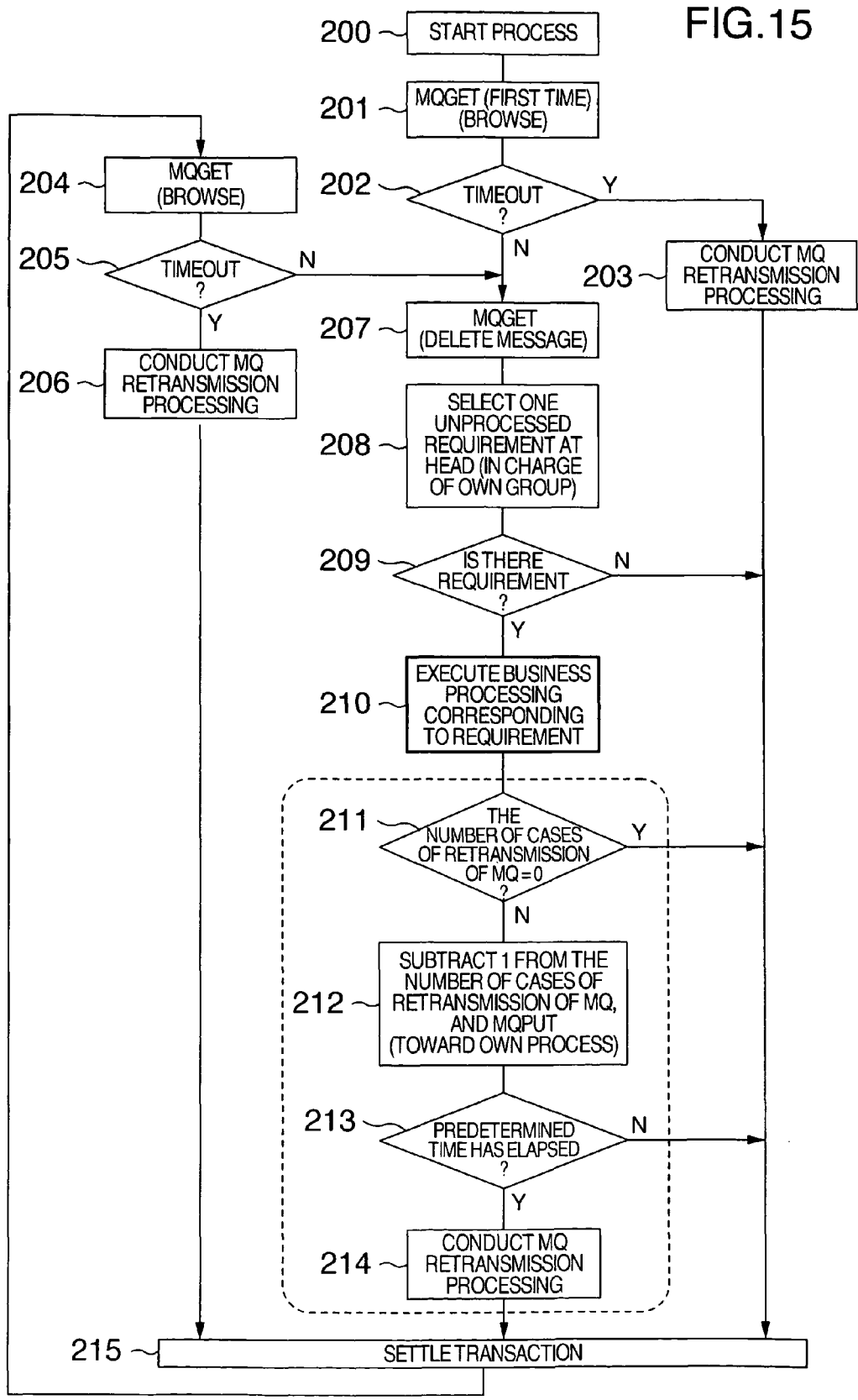
FIG. 15 is a flow chart showing contents of processing in a third embodiment of the present invention.

A processing flow of the present embodiment will now be described with reference to FIG. 15. First, a process is started at step 200 as initial processing. Here, the following steps will be described by taking processing conducted in the transaction processor 3 as an example. For example, a program used in the transaction processor is started.

Subsequently, at step 201, MQGET, i.e., a processing request is acquired. The MQ is transmitted from the acceptor 2, and stored in a predetermined storage. If the MQ is not present in an MQ storage, the operation of the MQGET times out. Here, if a predetermined time has elapsed, the MQ may be controlled to be invalidated as timeout. This predetermined time may be set so as to cause timeout in a shorter time at the time of process start than other cases. By thus setting, it becomes possible to prevent the stored MQ from being extinguished by system changeover. "At the time of process start" includes accessing the storage first after the start.

Subsequently, at step 202, it is detected whether the MQGET (or the MQ) has timed out. If timeout has occurred (the MQ is detected), then the transaction processor 3 proceeds to step 203 and transmits the MQ to itself. The MQ need only be a trigger for conducting retrieval in the requirement database, and information representing "what to do" may not be indicated. "What to do" is registered in (requirement information in) the requirement database. As "what to do," information that specifies, for example, corresponding order data (recorded in the order reception database or the like) is set in the requirement database. Thus, the MQ need only be one that serves as a trigger (more preferably one that is invalidated under a predetermined condition), and one other than an MQ may be used.

Figure 16:
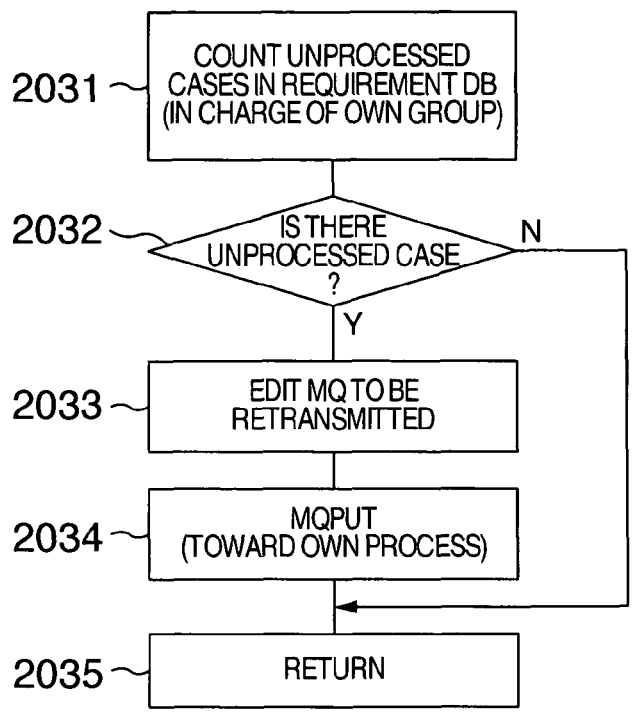
FIG. 16 is a flow chart for explaining details of retransmission processing in FIG. 15.

Details of the step 203 will now be described with reference to FIG. 16.

Figure 17:
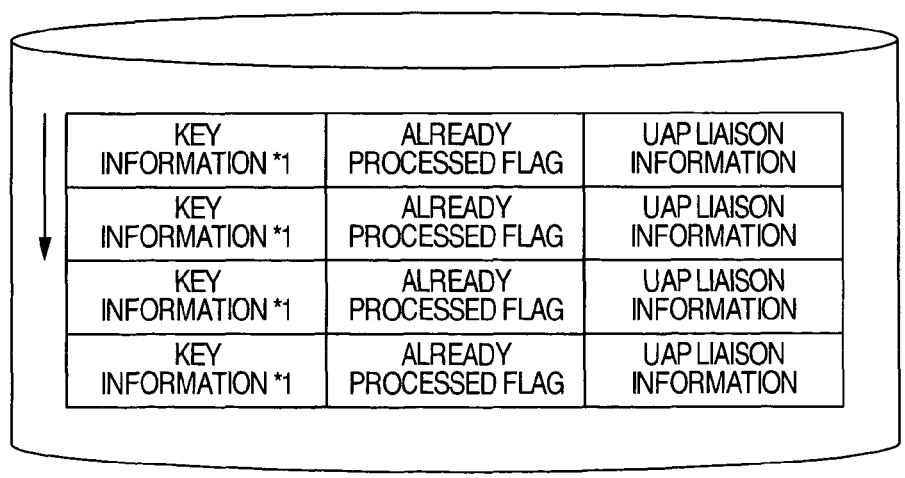
FIG. 17 is a diagram showing a requirement database.

First, at step 2031, the number of unprocessed cases (i.e., requirement information pieces) in the requirement database shown in FIG. 17 is counted. In other words, from among requirement information pieces, those having a processing completion flag that indicates unprocessed are extracted, and the number of requirement information pieces having information that the transaction processor should process (which may be identification information-of the transaction processor) is counted. It is also possible to first extract requirement information pieces having information that the transaction processor should process (which may be identification information of the transaction processor) and detect those having a processing completion flag that indicates unprocessed from the extracted requirement information pieces.

Subsequently, it is judged at step 2032 whether there is an unprocessed case at the step 2031. If there isn't an unprocessed case, the processing proceeds to step 215 and the step 203 is finished. If there is an unprocessed case, the processing proceeds to step 2033.

At the step 2033, the MQ to be transmitted to itself, i.e., to be retransmitted is edited (generated). As described above, the MQ need only be a trigger, and consequently the MQ need only contain information that identifies itself (transaction processor). More preferably, however, the MQ may contain a group code that identifies a group to which the transaction processor belongs (or the transaction processor itself) or key information such as processing time in registration of the corresponding requirement information. Here, as many MQs as at most the number of unprocessed cases counted at the step 2031 are generated. More preferably, the number of the MQs should be less than the number of unprocessed cases. This aims at preventing a transaction increase or queue overflow from being caused by the retransmission MQs. The number may be determined suitably by considering them.

The processing proceeds to step 2034, and the retransmission MQ is transmitted toward the own process (transaction processor). The present processing is finished (step 2035), and the processing proceeds to step 115.

The processing proceeds to the step 215 where the present transaction is settled and the processing proceeds to step 204. At the step 204, a processing request is acquired in the same way as the step 201. At step 205, it is detected whether timeout has occurred in the same way as the step 202. Here, the timeout value may be made longer than that at the step 202. If the result is timeout, the processing proceeds to step 206 and processing similar to that at the step 203 is executed.

The case where it is judged at the step 202 or the step 205 that timeout has not occurred will now be described. Under such a judgment, the processing proceeds to step 207. At the step 207, the MQ transmitted to itself inclusive of the MQ retransmitted at the step 203 or 206 is acquired from the storage. At this time, the acquired MQ is deleted from the storage that has stored the MQ until then.

Subsequently, at step 208, requirement information of one case is acquired from the required database (requirement DB) in response to the acquisition of the MQ. As for a method for acquiring requirement information of one case, key information contained in the MQ and contents (key information and time information (not illustrated)) of the requirement database shown in FIG. 17 are used. In other words, from among requirement information pieces, requirement information that has a processing completion flag indicating unprocessed and that is the oldest in registration is selected (it is possible to cause the key information and UAP information to contain these kinds of information). If the requirement information cannot be selected, the processing proceeds to step 215. If the requirement information is selected, the processing proceeds to step 210.

Subsequently, at step 210, transaction processing corresponding to the selected requirement information is executed in accordance with an application program by using the requirement information.

After termination of this step 210 or in parallel with the step 210, processing of steps 211 to 214 is executed. At step 211, the number of MQs retransmitted after the step 200 is counted. This is implemented by causing the MQ to contain the number of cases and counting it. This may be implemented by counting and recording every issuance. If as a result the number of retransmitted MQs is 0, the processing proceeds to step 215. Unless the number of retransmitted MQs is 0, the processing proceeds to step 212.

At the step 212, computation is conducted to subtract 1 from the number of retransmitted MQs stored in the storage. It is determined whether a predetermined time has elapsed (step 213). If as a result it is detected that the predetermined time has elapsed, the processing proceeds to the step 214 to execute retransmission in the same way as the step 203. If it is not detected that the predetermined time has elapsed, the processing proceeds to the step 215. Here, detection whether the predetermined time has elapsed is executed to conduct monitoring to cope with a fault of a partial device or queue overflow. Here, the number of retransmission cases is stored in the storage. Alternatively, the following configuration may be used. Although the number of retransmission cases is temporarily stored in a memory or the like, the retransmission MQ is caused to contain the number of retransmission cases. In other words, at the step 212, an MQ containing the number of retransmission cases obtained by subtracting 1 from the number of retransmission cases counted at the step 211 is retransmitted.

Figure 18:
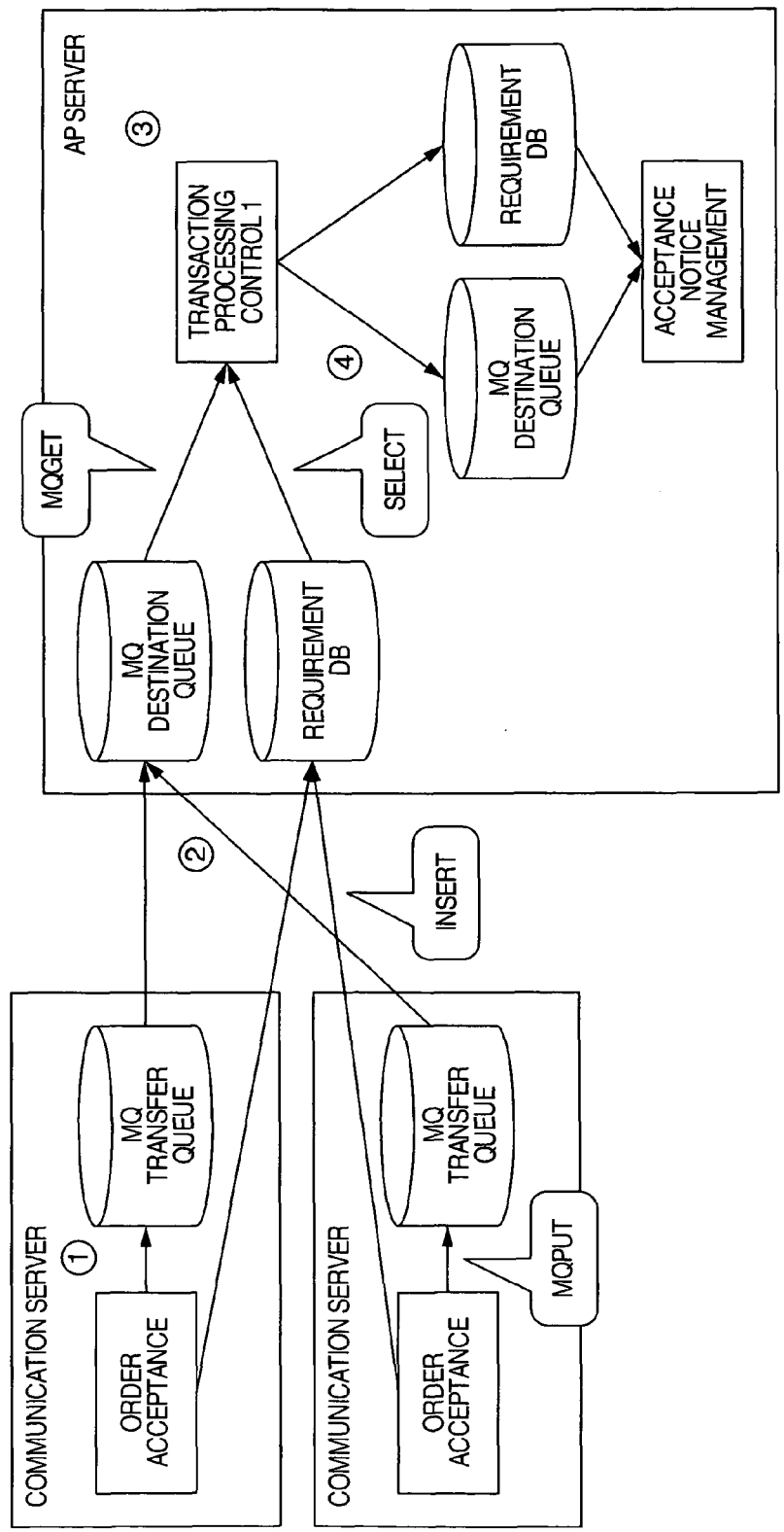
FIG. 18 is a diagram for explaining effects and a processing outline of the third embodiment.

According to the processing of the third embodiment heretofore described, it becomes possible to achieve effects shown in FIG. 18 and described hereafter. If only the requirement DB can be registered, it is possible to continue business processing in the order of requirement registration. It becomes possible to conduct processing without a remarkable delay owing to the MQ retransmission processing. In particular, it becomes possible to cope with the following cases: (1) the case where an MQ queue overflow in the processing request source server is caused by a large quantity of order inputs from partial participants (such as security companies); (2) the case where an MQ queue overflow is caused in the processing request destination by, for example, concentration of orders to a specific issue; (3) the case where MQs are lost by, for example, down of the processing request destination server; and (4) the case where MQs are not deleted by, for example, down of the processing request destination process and consequently an MQ queue overflow has occurred.

It becomes possible to raise the speed of responses in conducting processing on orders stored in the database in accordance with the principle of the time preference order and increase the number of processing cases per unit time, by handling the MQ as a trigger as in the present third embodiment.

Even if the MQs partially disappear due to concentration of orders to a specific issue, it becomes possible to conduct order processing without a delay to the utmost in the recovery processing according to the present third embodiment. The present third embodiment is effective to the case where MQs that do not become subjects of recovery at the time of fault are included (persistent MQs may be mixedly present). For example, the order acceptance process is disposed in a plurality of communication servers. In this case, when an MQ transfer delay or a fault in the middle of the transfer has occurred in a certain server, the transaction participant who has issued the pertinent order can be released from a fear of getting behind other transaction participants or being handicapped by a change of the transaction state of the issue.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A stock transaction system connected to a plurality of transaction terminals which transmit stock transaction orders, the transaction system conducting stock transaction processing according to orders received from the transaction terminals, the stock transaction system comprising:
a requirement database, in which the orders for different transaction issues received from different transaction terminals are stored, each of the orders being stored with a transaction state;
a plurality of accepting means, each of the plurality of accepting means performing an acceptance process for each order from a corresponding predetermined transaction terminal by registering accepted orders into the requirement database with the state of "acceptance", and transmitting a notification that the order is accepted to the order transmitting transaction terminal;
a plurality of registration processing means, each of the plurality of registration processing means performing a registration process for an order for a predetermined transaction issue by selecting the order for the predetermined transaction issue from the accepted orders in the requirement database, and updating the state of the selected order in the requirement database to "transaction" to indicate that the transaction is ready to be conducted;
a plurality of registration notifying means, each of the plurality of registration notifying means performing a notification process for the orders from the predetermined transaction terminals by selecting the orders from the predetermined transaction terminals from the orders with the "transaction" state in the requirement database, and transmitting a notification that the order is registered to the order transmitting transaction terminal;
a plurality of contract processing means, each of the plurality of contract processing means performing a contract process for orders for a predetermined transaction issue by making a contract between orders for the predetermined transaction issue with "transaction" states in the requirement database, the contracted orders being complementary sell/buy orders for a transaction issue, the contract process including a check process that checks whether there are orders which are complementary in selling/buying of a same transaction issue and in which the sell order matches the buy order in price and number of shares, and a database update process that updates the state of the contracted order in the requirement database to "contract" and that updates the state of an uncontracted order in the requirement database to "uncontracted"; and
a plurality of contract notifying means, each of the plurality of contract notifying means performing a notification process for the order from the predetermined transaction terminal by selecting the contracted orders from the predetermined transaction terminal and transmitting a notification that the contract is made to the order transmitting transaction terminals,
wherein the order for each transaction issue is processed by one of the plurality of registration processing means and by one of the plurality of contract processing means.

2. The stock transaction system according to claim 1, wherein the accepting means receives the order including stock name, selling or buying, a desired amount of money, number of stocks, and identification information for identifying the order transmitting transaction terminal from the predetermined transaction terminal,
determines whether or not the order is received without any trouble, and
registers the order determined to be received without any trouble with the state of "acceptance" into the requirement database.

3. The stock transaction system according to claim 2, wherein the registration processing means selects the order with "acceptance" state, the stock name included in which coincides with the predetermined stock name, from the requirement database,
determines whether or not the selected order has a correct format; and
updates the state of the order determined to have the correct format to "transaction".

4. The stock transaction system according to claim 3, wherein the contract processing means selects the order with "transaction" state, the stock name included in which coincides with the predetermined stock name, from the requirement database,
determines whether or not there are counterpart orders in the selected orders, the desired amounts of money and the numbers of stocks included in which satisfy each other to make a contract between the counterpart orders,
updates the states of the orders determined to be the counterpart orders to "contract", and
updates the state of the order having no counterpart order to "uncontracted".

5. The stock transaction system according to claim 1, wherein, when the registration processing means fails the registration process, the order for the predetermined stock name with "acceptance" state is selected from the requirement database again to update the state of the selected order to "transaction".

6. The stock transaction system according to claim 1, wherein the accepting means registers acceptance process start time of the accepted order in association with an acceptance number of the accepted order into the requirement database,
wherein the registration processing means registers registration process start time of the order read from the requirement database in association with the acceptance number of the order into the requirement database, and
wherein the registration notifying means registers notification process start and end times of the order read from the requirement database in association with the acceptance number of the order into the requirement database.

7. The stock transaction system according to claim 6, wherein the contract processing means registers contract process start time of the order read from the requirement database in association with the acceptance number of the order into the requirement database, and
wherein the contract notifying means registers notification process start and end times of the order read from the requirement database in association with the acceptance number of the order into the requirement database.

8. A stock transaction method in a stock transaction system connected to a plurality of transaction terminals which transmit stock transaction orders and conducting stock transaction processing according to the orders received from the transaction terminals,
the transaction system including:
a requirement database, in which the orders for different stock names received from different transaction terminals are stored;

a plurality of acceptors, each of the plurality of acceptors performing an acceptance process of the order of a corresponding predetermined transaction terminal;

a plurality of transaction processors, each of the plurality of transaction processors performing a transaction process of the order for a predetermined stock name; and a plurality of contract processors, each of the plurality of contract processors performing a contract process of the orders for a predetermined stock name, the method including the steps of:

performing, by each acceptor, the acceptance process of the order of the predetermined transaction terminal, registering the accepted order into the requirement database with the state of "acceptance" and transmitting a notification that the order is accepted to the order transmitting transaction terminal;

selecting, by each transaction processor, the order for the predetermined stock name from the orders with "acceptance" state in the requirement database, and updating the state of the selected order in the requirement database to "transaction" indicating that the transaction is ready to be conducted;

selecting, by each acceptor, the orders of the predetermined transaction terminals from the orders with "transaction" state in the requirement database, and transmitting a notification that the order is registered to the order transmitting transaction terminal;

making, by each contract processor, a contract between orders for the predetermined stock name with "transaction" states in the requirement database, the contracted orders being complementary sell/buy orders for a stock, the contract process including a check process for checking whether there are orders which are complementary in selling/buying of a same transaction issue and in which the sell order matches the buy order in price and number of shares, and updating the state of the contracted order in the requirement database to "contract" and the state of the uncontracted order in the requirement database to "uncontracted"; and selecting, by each acceptor, the orders with "contract" state of the predetermined transaction terminal and transmitting a notification that the contract is made to the order transmitting transaction terminals, wherein the order for each stock name is processed by one of the plurality of transaction processors and by one of the plurality of contract processors.

9. The stock transaction method according to claim 8, further comprising:

receiving, by the acceptor, the order including stock name, selling or buying, a desired amount of money, number of stocks, and identification information for identifying the order transmitting transaction terminal from the predetermined transaction terminal;

determining, by the acceptor, whether or not the order is received without any trouble; and registering, by the acceptor, the order determined to be received without any trouble with the state of "acceptance" into the requirement database.

10. The stock transaction method according to claim 9, further comprising:

selecting, by the transaction processor, the order with "acceptance" state, the stock name included in which coincides with the predetermined stock name, from the requirement database;

determining, by the transaction processor, whether or not the selected order has a correct format; and updating, by the transaction processor, the state of the order determined to have the correct format in the requirement database to "transaction".

11. The stock transaction method according to claim 10, further comprising:

selecting, by the contract processor, the order with "transaction" state, the stock name included in which coincides with the predetermined stock name, from the requirement database;

determining, by the contract processor, whether or not there are counterpart orders in the selected orders, the desired amounts of money and the numbers of stocks included in which satisfy each other to make a contract between the counterpart orders;

updating, by the contract processor, the states of the orders determined to be the counterpart orders in the requirement database to "contract"; and updating, by the contract processor, the state of the order having no counterpart order in the requirement database to "uncontracted".

12. The stock transaction method according to claim 8, further comprising:

when the transaction processor fails the transaction process, the order for the predetermined stock name with "acceptance" state is selected from the requirement database again to update the state of the selected order to "transaction".

13. The stock transaction method according to claim 8, further comprising:

registering, by the acceptor, acceptance process start time of the accepted order in association with an acceptance number of the accepted order into the requirement database, and registering, by the acceptor, registration notification process start time of the order with "transaction" state read from the requirement database in association with the acceptance number of the order in the requirement database; and registering, by the transaction processor, transaction process start time of the order with "acceptance" state read from the requirement database in association with the acceptance number of the order into the requirement database.

14. The stock transaction method according to claim 13, further comprising:

registering, by the acceptor, contract notification process start and end times of the order with "contract" state read from the requirement database in association with the acceptance number of the order into the requirement database; and registering, by the contract processor, contract process start time and end of the order with "transaction" state read from the requirement database in association with the acceptance number of the order into the requirement database.

15. A stock transaction system connected to a plurality of transaction terminals which transmit stock transaction orders, the transaction system conducting stock transaction processing according to the orders received from the transaction terminals, the stock transaction system comprising:

a requirement database, in which the orders for different stock names received from different transaction terminals are stored, each of the orders being stored with transaction states;

a plurality of acceptors, each of the plurality of acceptors performing an acceptance process of the order of a corresponding predetermined transaction terminal by registering the accepted order into the requirement database with the state of "acceptance", and transmitting a notification that the order is accepted to the order transmitting transaction terminal, selecting the orders of the predetermined transaction terminals with "transaction" state in the requirement database, and transmitting a notification that the order is registered to the order transmitting transaction terminal, and selecting the contracted orders of the predetermined transaction terminal with "contract" state in the requirement database, and transmitting a notification that the contract is made to the order transmitting transaction terminal;

a plurality of transaction processors, each of the plurality of transaction processors performing a registration process of an order for a predetermined stock name by selecting the order for the predetermined stock name with "acceptance" state in the requirement database, and updating the state of the selected order in the requirement database to "transaction" indicating that the transaction is ready to be conducted; and a plurality of contract processors, each of the plurality of contract processors performing a contract process for orders for a predetermined stock name by making a contract between orders for the predetermined stock name with "transaction" states in the requirement database, the contracted orders being complementary sell/buy orders for a stock, the contract process including a check process for checking whether there are orders which are complementary in selling/buying of a same stock and in which the sell order matches the buy order in price and number of shares, and an updating process for updating the state of the contracted order in the requirement database to "contract" and for updating the state of an uncontracted order in the requirement database to "uncontracted", wherein the order for each stock name is processed by one of the plurality of transaction processors and by one of the plurality of the contract processors.

16. The stock transaction system according to claim 15, wherein the acceptor receives the order including stock name, selling or buying, a desired amount of money, number of stocks, and identification information for identifying the order transmitting transaction terminal from one of the predetermined transaction terminals, determines whether or not the order is received without any trouble, and registers the order determined to be received without any trouble with the state of "acceptance" into the requirement database.

17. The stock transaction system according to claim 16, wherein the transaction processor selects the order with "acceptance" state, the stock name included in which coincides with the predetermined stock name, from the requirement database, determines whether or not the selected order has a correct format; and updates the state of the order determined to have the correct format to "transaction".

18. The stock transaction system according to claim 17, wherein the contract processor selects the order with "transaction" state, the stock name included in which coincides with the predetermined stock name, from the requirement database, determines whether or not there are counterpart orders in the selected orders, the desired amounts of money and the numbers of stocks included in which satisfy each other to make a contract between the counterpart orders, updates the states of the orders determined to be the counterpart orders to "contract", and updates the state of the order having no counterpart order to "uncontracted".

19. The stock transaction system according to claim 15, wherein, when the transaction processor fails the transaction process, the order for the predetermined stock name with "acceptance" state is selected from the requirement database again to update the state of the selected order to "transaction".

20. The stock transaction system according to claim 15, wherein the acceptor registers acceptance process start time of the accepted order in association with an acceptance number of the accepted order into the requirement database, and registers registration notification process start of the order with "transaction" state read from the requirement database in association with the acceptance number of the order into the requirement database, and wherein the transaction processor registers transaction process start time of the order with "transaction" state read from the requirement database in association with the acceptance number of the order into the requirement database.

21. The stock transaction system according to claim 20, wherein the acceptor registers contract notification process start and end times of the order with "contract" state read from the requirement database in association with the acceptance number of the order into the requirement database, and wherein the contract processor registers contract process start and end times of the order with "transaction" state read from the requirement database in association with the acceptance number of the order into the requirement database.

22. The stock transaction system according to claim 1, wherein in each registration processing means, the order selecting is triggered independently from the accepting means.

* * * * *